US011130859B2

(12) United States Patent
Miyabe et al.

(10) Patent No.: US 11,130,859 B2
(45) Date of Patent: Sep. 28, 2021

(54) POLYESTER-BASED RESIN COMPOSITION AND PRODUCTION PROCESS THEREFOR, MOLDED OBJECT AND PRODUCTION PROCESS THEREFOR, AND MASTERBATCH

(71) Applicant: MITSUBISHI GAS CHEMICAL COMPANY, INC., Tokyo (JP)

(72) Inventors: Takanori Miyabe, Kanagawa (JP); Nobuhiko Matsumoto, Kanagawa (JP); Takafumi Oda, Kanagawa (JP); Tomonori Kato, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 418 days.

(21) Appl. No.: 15/779,807

(22) PCT Filed: Nov. 21, 2016

(86) PCT No.: PCT/JP2016/084422
§ 371 (c)(1),
(2) Date: May 29, 2018

(87) PCT Pub. No.: WO2017/094542
PCT Pub. Date: Jun. 8, 2017

(65) Prior Publication Data
US 2020/0247987 A1 Aug. 6, 2020

(30) Foreign Application Priority Data
Dec. 1, 2015 (JP) .............................. JP2015-235125

(51) Int. Cl.
C08L 67/02 (2006.01)
C08G 63/183 (2006.01)
C08G 63/199 (2006.01)
C08K 3/08 (2006.01)
C08L 77/06 (2006.01)

(52) U.S. Cl.
CPC ............ *C08L 67/02* (2013.01); *C08G 63/183* (2013.01); *C08G 63/199* (2013.01); *C08K 3/08* (2013.01); *C08L 77/06* (2013.01); *C08K 2003/0843* (2013.01); *C08L 2201/10* (2013.01); *C08L 2201/14* (2013.01); *C08L 2203/30* (2013.01); *C08L 2205/03* (2013.01); *C08L 2310/00* (2013.01)

(58) Field of Classification Search
CPC .................................................. C08L 2310/00
See application file for complete search history.

(56) References Cited

U.S. PATENT DOCUMENTS

| 2003/0068455 A1 | 4/2003 | Oguro et al. |
| 2014/0234493 A1* | 8/2014 | Forloni .................. B32B 27/30 |
| | | 426/113 |
| 2014/0364547 A1 | 12/2014 | Iwasaki et al. |
| 2015/0030793 A1 | 1/2015 | Miyabe et al. |
| 2017/0037239 A1 | 2/2017 | Miyabe et al. |

FOREIGN PATENT DOCUMENTS

| CN | 103797069 A | 5/2014 |
| CN | 104159970 A | 11/2014 |
| GB | 2425127 A | 10/2006 |
| JP | 2003-113295 A | 4/2003 |
| JP | 2006-044219 A | 2/2006 |
| JP | 2008-239993 A | 10/2008 |
| WO | 2005/063887 A1 | 7/2005 |
| WO | 2006/138636 A1 | 12/2006 |
| WO | 2013/133352 A1 | 9/2013 |
| WO | 2015/098862 A1 | 7/2015 |

OTHER PUBLICATIONS

International Search Report for PCT/JP2016/084422 dated Jan. 10, 2017; English translation submitted herewith (5 pages).

* cited by examiner

*Primary Examiner* — Ana L. Woodward
(74) *Attorney, Agent, or Firm* — Fitch, Even, Tabin & Flannery LLP

(57) ABSTRACT

Provided is a polyester-based resin composition capable of giving a molded article excellent in transparency and gas-barrier property even though the molded article requires stretching treatment, and also provided is a method for producing the composition. The method for producing a polyester-based resin composition includes a step of obtaining a master batch (M) containing a polyester resin (A) having a cyclic acetal structure or an alicyclic hydrocarbon structure, and a polyamide resin (B), and a step of melt-kneading the master batch (M) with a polyester resin (R) in which 70 mol % or more of the dicarboxylic acid unit is derived from an aromatic dicarboxylic acid and 70 mol % or more of the diol unit is derived from an aliphatic diol, thereby giving a polyester-based resin composition, in this order. The glass transition temperature of the polyester resin (A) is 105° C. or lower, the content of the polyester resin (A) in the polyester-based resin composition is 0.5 to 15.0% by mass, and the content of the polyamide resin (B) is 0.5 to 10.0% by mass.

16 Claims, No Drawings

POLYESTER-BASED RESIN COMPOSITION AND PRODUCTION PROCESS THEREFOR, MOLDED OBJECT AND PRODUCTION PROCESS THEREFOR, AND MASTERBATCH

CROSS-REFERENCE TO RELATED APPLICATIONS

This application is a U.S. national phase application filed under 35 U.S.C. § 371 of International Application PCT/JP2016/084422, filed Nov. 21, 2016, designating the United States, which claims priority from Japanese Application Number 2015-235125, filed Dec. 1, 2015.

FIELD OF THE INVENTION

The present invention relates to a polyester-based resin composition and a method for producing the same, a molded article and a method for producing the same, and a master batch.

BACKGROUND OF THE INVENTION

Polymers obtained using an aromatic dicarboxylic acid compound and an aliphatic diol compound as monomers, for example, polyester resins typified by polyethylene terephthalate (PET) and others are excellent in transparency, mechanical properties, melt stability, solvent resistance, flavor retention, gas-barrier property, recyclability, etc. Consequently, aromatic polyester resins are widely used for various wrapping/packaging materials such as films, sheets, hollow containers, etc. Polyester resins have high gas-barrier property but are not always sufficient for use that requires further gas-barrier property against oxygen, carbon dioxide and the like. There have been employed some methods for improving the gas-barrier property of polyester resins, including coating a molded article and a package container made of a polyester resin with aluminum oxide or silicon oxide through vapor deposition, or coating, laminating or melt-mixing a molded article and a package container made of a polyester resin with a resin having gas-barrier property higher than that of a polyester resin.

An example of the resin having such higher gas-barrier property than polyester resins is an ethylene-vinyl alcohol copolymer resin. The ethylene-vinyl alcohol copolymer resin has poor compatibility with polyester resin, due to a characteristic intrinsic to the molecular structure thereof. When the two resins are mixed together, the formed resin composition assumes a turbid state, impairing transparency, which is a merit of polyester resin. Further, at a most suitable processing temperature for polyester resin, the ethylene-vinyl alcohol copolymer resin tends to rapidly undergo thermal degradation, and is therefore causes a problem of detracting from the processing stability of polyester resin.

Examples of other gas-barrier resins than ethylene-vinyl alcohol copolymers include polyamides, typically nylon 6 and nylon 66. In particular, polymetaxylyleneadipamide, which is formed through polymerization of a diamine component mainly including metaxylylenediamine and a dicarboxylic acid component mainly including adipic acid, is a polyamide resin especially excellent in gas-barrier property, and is therefore favorable. As compared with any other polyamide resins, polymetaxylyleneadipamide has higher gas-barrier property and, in addition, has a glass transition temperature, a melting point and crystallinity that are almost equivalent to those of polyethylene terephthalate, which is one of the most generally used polyester resins, has a similar molding condition to that of polyethylene terephthalate, and can therefore readily mold and work with polyester resin. Consequently it may be said that polymetaxylyleneadipamide is a resin extremely suitable as a material for improving the gas-barrier property of polyester resin.

However, a molded article produced using a resin composition containing a polyester resin and a polyamide resin typified by polymetaxylyleneadipamide is insufficient in point of transparency, and its use in applications requiring high transparency is therefore limitative.

PTL 1 discloses, as a polyester-based resin composition that can be a forming material for a molded article excellent in transparency, color, etc., a resin composition containing a polyester resin and a polymetaxylyleneadipamide, in which, as the polyester resin, a polyester resin modified with a diol and/or a dicarboxylic acid having a cyclic acetal skeleton is used.

CITATION LIST

Patent Literature

PTL 1: JP-A 2008-239993

SUMMARY OF INVENTION

However, the invention described in PTL 1 is problematic in that, in the case where a molded article is produced according to the molding method that includes stretching treatment, the molded article has a pearly gloss (to have a pearl-like appearance) and is therefore insufficient in point of transparency.

An object of the present invention is to provide a polyester-based resin composition capable of providing a molded article excellent in transparency and gas-barrier property even if the molded article is subjected to a stretching treatment, and a method for producing the same. Further, other objects of the present invention are to provide a molded article produced using the polyester-based resin composition (including the polyester-based resin composition obtained according to the production method) and a method for producing the same, and a master batch favorably used for producing the polyester-based resin composition.

The present inventors have made assiduous studies in consideration of the above-mentioned problems and, as a result, have found that, in a polyester-based resin composition containing a specific polyester resin (A) having a cyclic acetal structure or an alicyclic hydrocarbon structure, a polyamide resin (B), and a polyester resin (R) in which 70 mol % or more of the dicarboxylic acid unit is derived from an aromatic dicarboxylic acid and 70 mol % or more of the diol unit is derived from an aliphatic diol, when the glass transition temperature of the polyester resin (A) and the content of the polyester resin (A) and the polyamide resin (B) each are defined to fall within a specific range and when the resin composition is produced according to a specific production method, a polyester-based resin composition capable of giving a molded article excellent in gas-barrier property and transparency can be provided, and have completed the present invention. The present invention provides the following [1] to [25].

[1] A method for producing a polyester-based resin composition, including a step of obtaining a master batch (M) containing a polyester resin (A) having a cyclic acetal structure or an alicyclic hydrocarbon structure, and a polyamide resin (B), and a step of melt-kneading the master batch (M) with a polyester resin (R) in which 70 mol % or more of the dicarboxylic acid unit is derived from an aromatic dicarboxylic acid and 70 mol % or more of the diol unit is derived from an aliphatic diol, thereby giving a polyester-based resin composition, in this order, wherein the glass transition temperature of the polyester resin (A) is 105° C. or lower, the content of the polyester resin (A) in the polyester-based resin composition is 0.5 to 15.0% by mass, and the content of the polyamide resin (B) in the polyester-based resin composition is 0.5 to 10.0% by mass.

[2] The method for producing a polyester-based resin composition according to [1], wherein the content of the polyester resin (A) in master batch (M) is 10 to 90% by mass, and the content of the polyamide resin (B) is 10 to 90% by mass.

[3] The method for producing a polyester-based resin composition according to [1], wherein the master batch further contains the polyester resin (R).

[4] The method for producing a polyester-based resin composition according to [3], wherein the content of the polyester resin (A) in the master batch (M) is 3 to 90% by mass, and the content of the polyamide resin (B) is 3 to 90% by mass.

[5] The method for producing a polyester-based resin composition according to [3] or [4], wherein the content of the polyester resin (R) in the master batch (M) is 5% by mass or more.

[6] The method for producing a polyester-based resin composition according to any of [1] to [5], wherein the polyester-based resin composition further contains a transition metal.

[7] The method for producing a polyester-based resin composition according to [6], wherein the master batch (M) contains a transition metal.

[8] The method for producing a polyester-based resin composition according to [6] or [7], wherein the content of the transition metal in the polyester-based resin composition is 10 to 1,000 ppm.

[9] The method for producing a polyester-based resin composition according to any of [1] to [8], wherein the polyamide resin (B) is a polyamide resin having a diamine unit containing a metaxylylenediamine unit in an amount of 70 mol % or more and a dicarboxylic acid unit containing an α,ω-aliphatic dicarboxylic acid in an amount of 70 mol % or more.

[10] The method for producing a polyester-based resin composition according to any of [1] to [9], wherein the relative viscosity of the polyamide resin (B) is 1.5 to 4.2.

[11] The method for producing a polyester-based resin composition according to any of [1] to [10], wherein the polyester resin (A) is a polyester resin having at least one of a dicarboxylic acid unit having a cyclic acetal structure and a diol unit having a cyclic acetal structure.

[12] The method for producing a polyester-based resin composition according to any of [1] to [11], wherein the polyester resin (A) is a polyester resin obtained through polycondensation with a dicarboxylic acid component containing a dicarboxylic acid having a cyclic acetal structure in an amount of 10 to 40 mol % of the total dicarboxylic acid component and/or a diol component containing a diol having a cyclic acetal structure in an amount of 10 to 40 mol % of the total diol component.

[13] The method for producing a polyester-based resin composition according to [11] or [12], wherein the diol unit having a cyclic acetal structure is derived from a compound represented by the following formula (1) or (2):

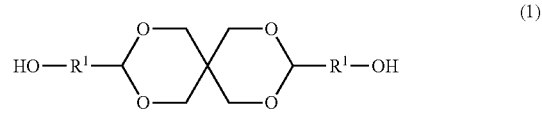

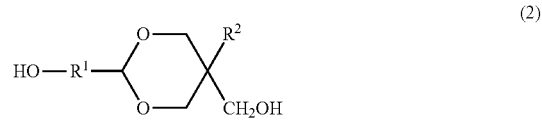

wherein $R^1$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms, and $R^2$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

[14] The method for producing a polyester-based resin composition according to [11] or [12], wherein the dicarboxylic acid unit having a cyclic acetal structure is derived from a compound represented by the following formula (3) or (4):

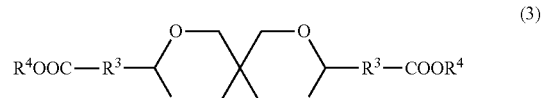

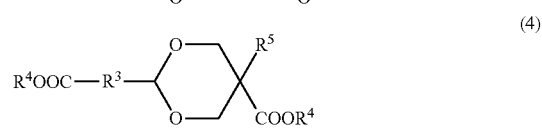

wherein $R^3$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms, $R^4$ each independently represents a hydrogen atom, a methyl group, an ethyl group or an isopropyl group, and $R^5$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

[15] The method for producing a polyester-based resin composition according to any of [1] to [10], wherein the polyester resin (A) is a polyester resin having at least one of a dicarboxylic acid unit having an alicyclic hydrocarbon structure and a diol unit having an alicyclic hydrocarbon structure.

[16] The method for producing a polyester-based resin composition according to [15], wherein the alicyclic hydrocarbon structure is a cycloalkane structure having 3 to 10 carbon atoms.

[17] The method for producing a polyester-based resin composition according to [15] or [16], wherein the diol unit having an alicyclic hydrocarbon structure is derived from a compound represented by the following formula (5):

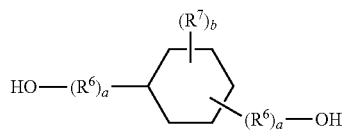

wherein $R^6$ each independently represents a divalent aliphatic group having 1 to 10 carbon atoms; $R^7$ represents a monovalent organic group selected from the group consisting of a monovalent aliphatic group having 1 to 10 carbon atoms, a monovalent alicyclic group having 3 to 12 carbon atoms and a monovalent aromatic group having 6 to 18 carbon atoms; a indicates 0 or 1, and when a=0, the hydroxyl group directly bonds to the cyclohexane ring; and b indicates an integer of 0 to 4.

[18] The method for producing a polyester-based resin composition according to [15] or [16], wherein the dicarboxylic acid unit having an alicyclic hydrocarbon structure is derived from a compound represented by the following formula (6):

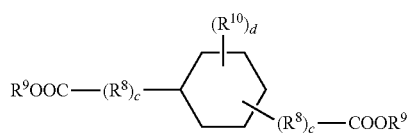

wherein $R^8$ each independently represents a divalent aliphatic group having 1 to 10 carbon atoms; $R^9$ each independently represents a hydrogen atom, a methyl group, an ethyl group or an isopropyl group; $R^{10}$ represents a monovalent organic group selected from the group consisting of a monovalent aliphatic group having 1 to 10 carbon atoms, a monovalent alicyclic group having 3 to 12 carbon atoms or a monovalent aromatic group having 6 to 18 carbon atoms; c indicates 0 or 1, and when c=0, the group -COOR$^9$ directly bonds to the cyclohexane ring; and d indicates an integer of 0 to 4.

[19] A method for producing a molded article, including a step of molding a polyester-based resin composition obtained according to the production method for a polyester-based resin composition of any of [1] to [18].

[20] The method for producing a molded article according to [19], wherein the molded article is a bottle, a cup or a film.

[21] A polyester-based resin composition obtained by melt-kneading a master batch (M) containing a polyester resin (A) having a cyclic acetal structure or an alicyclic hydrocarbon structure and a polyamide resin (B) with a polyester resin (R) in which 70 mol % or more of the dicarboxylic acid unit is derived from an aromatic dicarboxylic acid and 70 mol % or more of the diol unit is derived from an aliphatic diol, wherein the glass transition temperature of the polyester resin (A) is 105° C. or lower, the content of the polyester resin (A) in the polyester-based resin composition is 0.5 to 15.0% by mass, and the content of the polyamide resin (B) in the polyester-based resin composition is 0.5 to 10.0% by mass.

[22] The polyester-based resin composition according to [21], wherein the master batch (M) further contains the polyester resin (R).

[23] A molded article formed of the polyester-based resin composition of [21] or [22].

[24] The molded article according to [23], wherein the molded article is a bottle, a cup or a film.

[25] A master batch containing a polyester resin (A) having a cyclic acetal structure or an alicyclic hydrocarbon structure, a polyamide resin (B), and a polyester resin (R) in which 70 mol % or more of the dicarboxylic acid unit is derived from an aromatic dicarboxylic acid and 70 mol % or more of the diol unit is derived from an aliphatic diol.

According to the present invention, there can be provided a polyester-based resin composition capable of giving a molded article excellent in transparency and gas-barrier property even if the molded article is subjected to a stretching treatment, and a method for producing it. Further, according to the present invention, there can be provided a molded article produced from the polyester-based resin composition (including the polyester-based resin composition obtained according to the production method) and a method for producing it, and a master batch favorably used for production of the polyester-based resin composition.

DESCRIPTION OF EMBODIMENTS

The present invention is described hereinunder with reference to embodiments thereof. In the following description, the numerical range expressed by the wording "A to B" means "A or more and B or less" (in the case of A<B), or "A or less and B or more" (in the case of A>B). Specifically, this expression indicates a numeral range including the end points A and B.

Part by mass and % by mass are the same as part by weight and % by weight, respectively.

Method for Producing Polyester-Based Resin Composition, and Polyester-Based Resin Composition The method for producing a polyester-based resin composition of the present invention includes a step of obtaining a master batch (M) containing a polyester resin (A) having a cyclic acetal structure or an alicyclic hydrocarbon structure, and a polyamide resin (B), and a step of melt-kneading the master batch (M) with a polyester resin (R) in which 70 mol % or more of the dicarboxylic acid unit is derived from an aromatic dicarboxylic acid and 70 mol % or more of the diol unit is derived from an aliphatic diol, thereby giving a polyester-based resin composition, in this order, wherein the glass transition temperature of the polyester resin (A) is 105° C. or lower, the content of the polyester resin (A) in the polyester-based resin composition is 0.5 to 15.0% by mass, and the content of the polyamide resin (B) in the polyester-based resin composition is 0.5 to 10.0% by mass.

The polyester-based resin composition of the present invention is obtained by melt-kneading a master batch (M) containing a polyester resin (A) having a cyclic acetal structure or an alicyclic hydrocarbon structure and a polyamide resin (B) with a polyester resin (R) in which 70 mol % or more of the dicarboxylic acid unit is derived from an aromatic dicarboxylic acid and 70 mol % or more of the diol unit is derived from an aliphatic diol, wherein the glass transition temperature of the polyester resin (A) is 105° C. or lower, the content of the polyester resin (A) in the polyester-based resin composition is 0.5 to 15.0% by mass, and the content of the polyamide resin (B) in the polyester-based resin composition is 0.5 to 10.0% by mass.

In the following description, the polyester-based resin composition obtained according to the production method for a polyester-based resin composition of the present invention, and the polyester-based resin composition of the present invention are collectively called the polyester-based resin composition of the present invention.

As a result of assiduous studies, the present inventors have found that, in preparing a resin composition containing a specific amount of the polyester resin (A), a specific amount of the polyamide resin (B) and the polyester resin (R), when a master batch containing the polyester resin (A) and the polyamide resin (B) is prepared and then melt-kneaded with the polyester resin (R) to give a polyester-based resin composition, a resin composition capable of giving a molded article excellent in transparency and gas-barrier property can be obtained, and have completed the present invention. Though the details of the mechanism of action to realize the advantageous effects are not clear, a part thereof could be presumed as follows.

The present inventors have found that, in producing a molded article using a resin composition containing the polyamide resin (B) and the polyester resin (R), the interface between the two resins increases especially in stretching and the divergence in the refractive index between the two resins increases, and therefore the transparency of the molded article lowers owing to light scattering on the interface between the two resins. It is presumed that the polyester resin (A) could reduce the difference in the refractive index between the two resins and, as a result, could prevent light scattering, whereby the transparency of the molded article could be improved. In addition, it may be presumed that, by adding the master batch (M) containing the polyester resin (A) and the polyamide resin (B) to the polyester resin (R), the polyester resin (A) could suitably exist in the interface between the polyamide resin (B) and the polyester resin (R), therefore contributing more toward preventing light scattering and improving transparency.

The polyester resin (A), the polyamide resin (B) and the polyester resin (R) for use in the present invention are described hereinunder.

Polyester Resin (A)

In the present invention, the polyester resin (A) has a cyclic acetal structure or an alicyclic hydrocarbon structure, and the glass transition temperature of the polyester resin (A) is 105° C. or lower.

A first embodiment of the polyester resin (A) is a polyester resin (A1) having a cyclic acetal structure, and a second embodiment thereof is a polyester resin (A2) having an alicyclic hydrocarbon structure (but excepting one having a cyclic acetal structure). The polyester resin (A) is preferably the polyester resin (A1) having a cyclic acetal structure.

Polyester Resin (A1)

The polyester resin (A1) is a polyester resin having at least one of a cyclic acetal structure-having diol unit and a cyclic acetal structure-having dicarboxylic acid unit.

The cyclic acetal structure in the polyester resin (A1) may be introduced thereinto as a diol unit derived from a diol component or a dicarboxylic acid unit derived from a dicarboxylic acid component, but is preferably introduced as a diol unit derived from a diol component. The reason is considered to be because the cyclic acetal structure would not be always stable against acid.

The diol component that constitutes the cyclic acetal structure-having diol unit in the polyester resin (A1) is preferably a compound represented by the following formula (1) or (2).

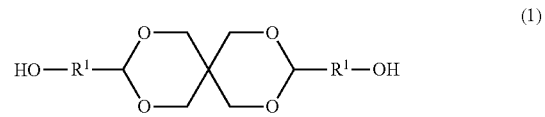

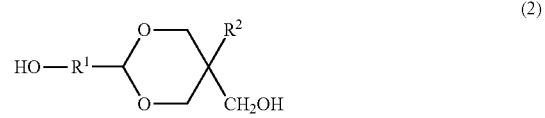

In the above-formulae (1) and (2), $R^1$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms.

In the above formula (2), $R^2$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

In the case where $R^1$ is a divalent aliphatic group, examples of the divalent aliphatic group include linear or branched alkylene group, alkenylene group, etc. The carbon number of the divalent aliphatic group is 1 to 10, preferably 1 to 6, more preferably 1 to 4. For example, there are mentioned a methylene group, an ethylene group (—CH$_2$CH$_2$—), a propylidene group (—CH(CH$_2$CH$_3$)—), a propylene group (—CH(CH$_3$)CH$_2$—), a trimethylene group (—CH$_2$CH$_2$CH$_2$—), an isopropylidene group (—C(CH$_3$)$_2$—), a tetramethylene group (—CH$_2$CH$_2$CH$_2$CH$_2$—), a butylidene group (—CH(CH$_2$CH$_3$)—), an isobutylene group (—CH(CH(CH$_3$)$_2$)—), a sec-butylidene group (—C(CH$_3$)(CH$_2$CH$_3$)—), an isobutylene group (—C(CH$_3$)2—CH$_2$—), etc. Among these, from the viewpoint of the transparency of the polyester-based resin composition of the present invention, $R^1$ is preferably an isobutylidene group, and more preferably an isobutylene group whose methylene group bonds to the hydroxyl group.

In the case where $R^1$ is a divalent alicyclic group, examples of the divalent alicyclic group include a cycloalkylene group, etc. The carbon number of the divalent alicyclic group is 3 to 12, preferably 6 to 9. The divalent alicyclic group may be a monocyclic ring or a polycyclic ring.

In the case where $R^1$ is a divalent aromatic group, examples of the divalent aromatic group include an arylene group such as a phenylene group, a biphenylene group, a naphthylene group, etc. The carbon number of the divalent aromatic group is 6 to 18, preferably 6 to 12.

In the case where $R^2$ is a monovalent aliphatic group, examples of the monovalent aliphatic group include linear or branched alkyl group, alkenyl group, etc. The carbon number of the monovalent aliphatic group is 1 to 10, preferably 1 to 6, more preferably 1 to 4. For example, there are mentioned a methyl group, an ethyl group, an n-propyl group, an isopropyl group, an n-butyl group, a sec-butyl group, an isobutyl group, a tert-butyl group, etc.

In the case where $R^2$ is a monovalent alicyclic group, examples of the monovalent alicyclic group include a cycloalkyl group, etc. The carbon number of the monovalent alicyclic group is 3 to 12, preferably 6 to 9. The cycloalkyl group may be a monocyclic ring or a polycyclic ring.

In the case where $R^2$ is a monovalent aromatic group, examples of the monovalent aromatic group include an aryl group such as a phenyl group, a biphenyl group, a naphthyl group, etc. The carbon number of the monovalent aromatic group is 6 to 18, preferably 6 to 12.

The aliphatic group, the alicyclic group, and the aromatic group may be further substituted with a substituent.

Examples of the substituent include a halogen atom such as a chlorine atom, a bromine atom, an iodine atom, etc.; a cyano group, a nitro group, an alkoxy group, an aryloxy group, an acyl group, an amino group, etc.

The diol component to constitute the cyclic acetal structure-having diol unit is especially preferably a compound represented by the above formula (1).

Specific examples of the compound represented by the above formula (1) include 3,9-bis(1,1- dimethyl-2-hydroxyethyl)-2,4,8,10 -tetraoxaspiro[5.5]undecane; and specific examples of the compound represented by the above formula (2) include 5-methylol-5-ethyl-2-(1,1-dimethyl-2-hydroxyethyl)-1,3-dioxane.

In the case where the polyester resin (A1) has a diol unit having a cyclic acetal structure, the content of the cyclic acetal structure-having diol unit is, from the viewpoint of maintaining molding workability and from the viewpoint of the gas-barrier property of the molded article formed of the polyester-based resin composition, preferably 3 to 45 mol % relative to the total amount of the diol unit, more preferably 10 to 40 mol %, even more preferably 15 to 30 mol % still more preferably 15 to 25 mol %.

The dicarboxylic acid component to constitute the cyclic acetal structure-having dicarboxylic acid unit in the polyester resin (A1) is preferably a compound represented by the following formula (3) or (4).

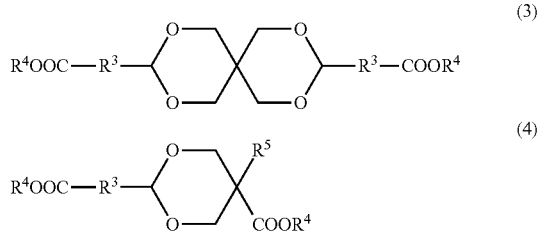

In the above formulae (3) and (4), $R^3$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms, $R^4$ each independently represents a hydrogen atom, a methyl group, an ethyl group or an isopropyl group.

In the above formula (4), $R^5$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

As specific examples of the divalent aliphatic group, the divalent alicyclic group and the divalent aromatic group, there may mentioned those exemplified hereinabove for $R^1$ in the above formulae (1) and (2), and the preferred examples are also the same; and as the monovalent aliphatic group, the monovalent alicyclic group and the monovalent aromatic group, there may mentioned those exemplified hereinabove for $R^2$ in the above formula (2), and the preferred examples are also the same.

Specific examples of the compound represented by the above formula (3) include 3.9-bis(1,1-dimethl-2-carboxyethyl)-2,4,8,10-tetraoxaspiro[5.5]undecane, 3,9-bis(2-carboxyethyl)-2,4,8,10-tetraoxaspiro[5.5]undecane, etc.; and specific examples of the compound represented by the above formula (4) include 5-carboxy -5-ethyl-2-(1,1-dimethyl-2-carboxyethyl)-1,3-dioxane, 5-carboxy-5-ethyl-2-(2-carboxyethyl)-1,3-dioxane, etc.

In the case where the polyester resin (A1) has a dicarboxylic acid unit having a cyclic acetal structure, the content of the cyclic acetal structure-having dicarboxylic acid unit is, from the viewpoint of maintaining molding workability and from the viewpoint of the gas-barrier property of the molded article formed of the polyester-based resin composition, preferably 3 to 45 mol % relative to the total amount of the dicarboxylic acid unit, more preferably 10 to 40 mol %, even more preferably 15 to 35 mol %, further more preferably 15 to 25 mol %.

The polyester resin (A1) may have both a diol unit having a cyclic acetal structure and a dicarboxylic acid unit having a cyclic acetal structure, however it is preferable that the polyester resin (A1) has a diol unit having a cyclic acetal structure or a dicarboxy acid unit having a cyclic actal structure, and it is more preferable that the polyester resin (A1) has a diol unit having a cyclic acetal structure. In the case where the polyester resin (A1) has both a diol unit having a cyclic acetal structure and a dicarboxylic acid unit having a cyclic acetal structure, the content of the structural unit having a cyclic acetal structure is, from the viewpoint of maintaining molding workability and from the viewpoint of the gas-barrier property of the molded article formed of the polyester-based resin composition, preferably 1.5 to 22.5 mol % relative to the total amount of the dicarboxylic acid unit and the diol unit, more preferably 5 to 20 mol %, even more preferably 7.5 to 12.5 mol %.

The other diol unit than the cyclic acetal structure-having diol unit that may be contained in the polyester resin (A1) includes an aliphatic diol unit, an alicyclic diol unit and an aromatic diol unit, preferably an aliphatic diol unit and an alicyclic diol unit, and more preferably an aliphatic diol unit.

In the case where the polyester resin (A1) contains an aliphatic diol unit therein, the content of the aliphatic diol unit in the diol unit is, from the viewpoint of easiness in drying before use, preferably 55 mol % or more, more preferably 60 mol % or more, even more preferably 70 mol % or more, and is preferably 97 mol % or less, more preferably 90 mol % or less, and even more preferably 85 mol % or less.

The carbon number of the aliphatic diol unit that may be contained in the polyester resin (A1) is preferably 2 to 24, more preferably 2 to 12, even more preferably 2 to 6. Specific examples of the compound capable of constituting the aliphatic diol unit include ethylene glycol, 1,2-propylene glycol, 1,3-propylene glycol, 1,4-butylene glycol, diethylene glycol, triethylene glycol, 1,2-butylene glycol, 1,3-butylene glycol, 2,3-butylene glycol, 1,5-pentanediol, neopentyl glycol, 1,6-hexanediol, etc. Ethylene glycol, propylene glycol and 1,4-butylene glycol are preferred, and ethylene glycol is more preferred.

The carbon number of the alicyclic diol unit that may be contained in the polyester resin (A1) is preferably 3 to 24, more preferably 6 to 12, even more preferably 6 to 10. Specific examples of the compound capable of constituting the alicyclic diol unit include 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,4-cyclohexanediethanol, etc.

The carbon number of the aromatic diol unit that may be contained in the polyester resin (A1) is preferably 6 to 24, more preferably 6 to 20. Specific examples of the compound capable of constituting the aromatic diol unit include hydroquinone, 4,4'-dihydroxybisphenol, 1,4-bis(P-hydroxyethoxyThenzene, bis[4-(2-hydroxyethoxy)phenyl]sulfone, bis(p-hydroxyphenyl)ether, bis(p-hydroxyphenyl) sulfone, bis(p-hydroxyphenyl)methane, 1,2-bis(p-hydroxyphenyl) ethane, bisphenol A, bisphenol C, 2,5-naphthalenediol, diols prepared by adding alkylene oxide such as ethylene oxide and propylene oxide to these diols, etc.

The polyester resin (A1) may contain a monoalcohol unit and a tri- or higher polyalcohol unit, etc., within a range not detracting from the advantageous effects of the present invention. Examples of the monoalcohol include butyl alcohol, hexyl alcohol, octyl alcohol, etc.; and examples of the tri- or higher polyalcohol include trimethylolpropane, glycerin, pentaerythritol, etc.

The polyester resin (A1) for use in the present invention may contain an aromatic dicarboxylic acid unit and an aliphatic dicarboxylic acid unit as the other dicarboxylic acid unit than the cyclic acetal structure-having dicarboxylic acid unit, and preferably contains an aromatic dicarboxylic acid unit.

In the case where the polyester resin (A1) contains an aromatic dicarboxylic acid unit, the content of the aromatic dicarboxylic acid unit in the dicarboxylic acid unit is preferably 55 mol % or more, more preferably 60 mol % or more, even more preferably 70 mol % or more, still more preferably 75 mol % or more, and is preferably 97 mol % or less, more preferably 90 mol % or less, and even more preferably 85 mol % or less.

As the compound capable of constituting the aromatic dicarboxylic acid unit that may be contained in the polyester resin (A1), a dicarboxylic acid and a derivative thereof having an aromatic nucleus, such as benzene, naphthalene, anthracene, biphenyl, diphenylether, diphenyl sulfone, diphenyl methane and the like can be used. Examples of the aromatic dicarboxylic acid derivative include an ester formed of an aromatic dicarboxylic acid and an alcohol having 1 to 3 carbon atoms.

Among these, terephthalic acid, isophthalic acid, naphthalenedicarboxylic acids such as 1,3-naphthalenedicarboxylic acid, 1,4-naphthalenedicarboxylic acid, 1,5-naphthalenedicarboxylic acid, 2,6-naphthalenedicarb oxylic acid, 2,7-naphthalenedicarboxylic acid, etc., 4,4'-biphenyldicarboxylic acid, 3,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, anthracenedicarboxylic acid, etc., and $C_{1-3}$short-chain alkyl esters thereof are preferred; terephthalic acid, isophthalic acid, 2,6-naphthalenedicarboxylic acid, 4,4'-biphenyldicarboxylic acid and their methyl esters and ethyl esters are more preferred; terephthalic acid, isophthalic acid and their methyl esters are even more preferred; and terephthalic acid and its methyl ester are most preferred.

Specific examples of the compound capable of constituting the aliphatic dicarboxylic acid unit that may be contained in the polyester resin (A1) include succinic acid, glutaric acid, adipic acid, pimellic acid, suberic acid, azelaic acid, sebacic acid, dodecanedicarboxylic acid, etc.

The polyester resin (A1) may contain a monocarboxylic acid unit, a tri- or higher poly-carboxylic acid unit, a carboxylic acid anhydride unit and the like, within a range not detracting from the advantageous effects of the present invention. Examples of the monocarboxylic acid include benzoic acid, propionic acid, butyric acid, etc.; and examples of the tri- or higher poly-carboxylic acid and the carboxylic acid anhydride include trimellitic acid, pyromellitic acid, trimellitic anhydride, pyromellitic anhydride, etc.

The polyester resin (A1) is obtained through polycondensation of a dicarboxylic acid unit to constitute a dicarboxylic acid unit and a diol component to constitute a diol unit, and to its production, any known method of a direct esterification method or an interesterification method is applicable.

Examples of the polycondensation catalyst to be used in producing the polyester resin (A1) include known antimony compounds such as antimony trioxide, antimony pentoxide, etc., known germanium compounds such as germanium oxide, etc. If desired, the ester may be subjected to solid-phase polymerization according to a known conventional method for increasing the molecular weight thereof.

Preferred examples of the polyester resin (A1) in the present invention include poly(ethylene-3,9-bisisobutylene-2,4,8,10-tetraoxaspiro[5.5]undecane-terephthalate), poly (ethylene-5-ethyl-2-isobutylene-5-methylene-1,3-dioxane-terephthalate), poly(ethylene-3,9-bisisobutylene -2,4,8,10-tetraoxaspiro[5.5]undecane-terephthalate), poly(ethylene-5-ethyl-2-isobutylene-5-methylene-1,3-dioxane-isophthalate), poly(ethylene-3,9-bisisobutylene-2,4,8,10-tetraoxaspiro [5.5]undecane-2,6-naphthalanedicarboxylate), poly(ethylene-5-ethyl-2-isobutylene-5-methylene-1,3-dioxane-2,6-naphthalanedicarboxylate), poly(ethylene -3,9-bisisobutylene -2,4,8,10 -tetraoxaspiro [5.5]undecane-terephthalate-4,4'-biphenyldicarboxylate), poly(ethylene-5-ethyl-2-isobutylene-5-methylene-1,3-dioxane-terephthalate-4,4'-biphenyldicarboxylate), etc.

Among these, from the viewpoint of gas-barrier property, transparency and availability, poly(ethylene -3,9-bisisobutylene -2,4,8,10-tetraoxaspiro[5.5]undecane-terephthalate) is preferred.

Polyester Resin (A2)

The polyester resin (A2) is a polyester resin having at least one of a diol unit having an alicyclic hydrocarbon structure and a dicarboxylic acid unit having an alicyclic hydrocarbon structure.

A polyester resin having an alicyclic hydrocarbon structure and having a cyclic acetal structure is the polyester resin (A1).

The alicyclic hydrocarbon structure in the polyester resin (A2) can be introduced thereinto as a diol component-derived diol unit or a dicarboxylic acid component-derived dicarboxylic acid unit, but preferably the resin has the structure as a diol component-derived diol unit.

The alicyclic hydrocarbon structure may be any of a monocyclic structure or a polycyclic structure (condensed-cyclic, crosslinked-cyclic or spiro-cyclic structure). The structure may have a substituent on the ring thereof.

The monocyclic alicyclic hydrocarbon structure includes a cycloalkane structure and a cycloalkene structure, and above all, a cycloalkane structure having 3 to 10 carbon atoms is preferred, a cycloalkane structure having 4 to 8 carbon atoms is more preferred, and a cycloalkane structure having 4 to 6 carbon atoms is even more preferred.

Specific examples of the polycyclic alicyclic hydrocarbon structure include bicyclo[4.4.0]decane (also known as decahydronaphthalane), bicyclo[2.2.1]hept-2-ene (also known as norbornene), tricyclo[3.3.1.1$^{3,7}$]decane (also known as adamantane), tricyclo(5.2.1.0$^{2,6}$)decane (also known as tetrahydrodicyclopentadiene), spiro[5.5]undecane (also known as spirobicyclohexane), etc.

The alicyclic hydrocarbon structure is preferably monocyclic. Above all, a cyclohexane structure is especially preferred.

Specific examples of the diol component to constitute the diol unit having an alicyclic hydrocarbon structure, which may be contained in the polyester resin (A2), include 1,2-cyclopropanediol, 1,2-cyclobutanediol, 1,3-cyclobutanediol, 2,2,4,4-tetramethyl-1,3-cyclobutanediol, 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, decahydro-1,5-naphthalenediol, decahydro-2,6-naphthalenediol, 1,3-adamantanediol, 1,2-cyclopropanedimethanol, 1,2-cyclobutanedimethanol, 1,3-cyclobutanedimethanol, 2,2,4,4-tetramethyl-1,3-cyclobutanedimethanol, 1,2-cyclopentanedimethanol, 1,3-cyclopentanedimethanol, 3-methyl-1,2-cyclopentanedimethanol, 1,2-cyclohexanedimethanol, 1,3-cyclohexanedimethanol, 1,4-cyclohexanedimethanol, decahydro-1,5-naphthalenedimethanol, decahydro-2,6-naphthalenedimethanol, 5-norbornene-2,3-dimethanol, 1,3-adamantanedimethanol and tricycle(5.2.1.0$^{2,6}$)decane-4,8-dimethanol, to which, however, the component is not limited. In the case where these have optical activity, these may be optical isomers.

Among the above-mentioned diol components, 1,2-cyclopropanediol, 1,2-cyclobutanediol, 1,3-cyclobutanediol, 2,2,4,4-tetramethyl-1,3-cyclobutanediol, 1,2-cyclopentanediol, 1,3-cyclopentanediol, 3-methyl-1,2-cyclopentanediol, 1,2-cyclohexanediol, 1,3-cyclohexanediol, 1,4-cyclohexanediol, 1,2-cyclopropanedimethanol, 1,2-cyclobutanedimethanol, 1,3-cyclobutanedimethanol, 2,2,4,4-tetramethyl-1,3-cyclobutanedimethanol, 1,2-cyclopentanedimethanol, 1,3-cyclopentanedimethanol, 3-mehtyl-1,2-cyclopentanedimethanol, 1,2-cyclohexanedimethanol, 1,3-cyclohexanedimethanol and 1,4-cyclohexanedimethanol that are compounds having a monocyclic alicyclic hydrocarbon structure are preferred.

Specific examples of the dicarboxylic acid component to constitute the dicarboxylic acid unit having an alicyclic hydrocarbon structure, which may be contained in the polyester resin (A2), include 1,2-cyclopropanedicarboxylic acid, 1,2-cyclobutanedicarboxylic acid, 1,3-cyclobutanedicarboxylic acid, 2,2,4,4-tetramethyl-1,3-cyclobutanedicarboxylic acid, 1,2-cyclopentanedicarboxylic acid, 1,3-cyclopentanedicarboxylic acid, 3-methyl-1,2-cyclopentanedicarboxylic acid, 1,2-cyclohexanedicarboxylic acid, 1,3-cyclohexanedicarboxylic acid, 1,4-cyclohexanedicarboxylic acid, decahydro-1,5-naphthalenedicarboxylic acid, decahydro-2,6-naphthalenedicarboxylic acid, 1,3-adamantanedicarboxylic acid and their esters, to which, however, the component is not limited. In the case where these have optical activity, these may be optical isomers.

Among the above-mentioned dicarboxylic acid components, 1,2-cyclopropanedicarboxylic acid, 1,2-cyclobutanedicarboxylic acid, 1,3-cyclobutanedicarboxylic acid, 2,2,4,4-tetramethyl-1,3-cyclobutanedicarboxylic acid, 1,2-cyclopentanedicarboxylic acid, 1,3-cyclopentanedicarboxylic acid, 3-mehtyl-1,2-cyclopentanedicarboxylic acid, 1,2-cyclohexanedicarboxylic acid, 1,3-cyclohexanedicarboxylic acid, 1,4-cyclohexanedicarboxylic acid and their esters that are compounds having a monocyclic alicyclic hydrocarbon structure are preferred.

The diol component to constitute the diol unit having an alicyclic hydrocarbon structure, which may be contained in the polyester resin (A2), is preferably a compound represented by the following formula (5).

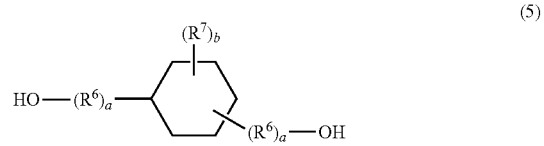

(5)

In the above formula (5), $R^6$ each independently represents a divalent aliphatic group having 1 to 10 carbon atoms, and $R^7$ represents a monovalent organic group selected from the group consisting of a monovalent aliphatic group having 1 to 10 carbon atoms, a monovalent alicyclic group having 3 to 12 carbon atoms and a monovalent aromatic group having 6 to 18 carbon atoms. a indicates 0 or 1, and when a=0, the hydroxyl group directly bonds to the cyclohexane ring. b indicates an integer of 0 to 4, and is preferably 0 from the viewpoint of the transparency of the resin composition of the present invention.

Examples of the divalent aliphatic group represented by $R^6$ include linear or branched alkylene group and alkenylene group, etc. The carbon number of the divalent aliphatic group is 1 to 10, preferably 1 to 6, more preferably 1 to 4. For example, there are mentioned a methylene group, an ethylene group (—CH$_2$CH$_2$—), a propylidene group (—CH(CH$_2$CH$_3$)—), a propylene group (—CH(CH$_3$)CH$_2$—), a trimethylene group (—CH$_2$CH$_2$CH$_2$—), an isopropylidene group (—C(CH$_3$)$_2$—), a tetramethylene group (—CH$_2$CH$_2$CH$_2$CH$_2$—), a butylidene group (—CH(CH$_2$CH$_2$CH$_3$)—), an isobutylene group (—CH(CH(CH$_3$)$_2$)—), a sec-butylidene group (—C(CH$_3$)(CH$_2$CH$_3$)—), an isobutylene group (—C(CH$_3$)$_2$—CH$_2$—), etc. Among these, from the viewpoint of the transparency of the polyester-based resin composition of the present invention, $R^6$ is preferably a methylene group.

In the case where $R^7$ is a monovalent aliphatic group, examples of the monovalent aliphatic group include linear or branched alkyl group, alkenyl group, etc. The carbon number of the monovalent aliphatic group is 1 to 10, preferably 1 to 6, more preferably 1 to 4. For example, there are mentioned a methyl group, an ethyl group, an n-propyl group, an isopropyl group, an n-butyl group, a sec-butyl group, an isobutyl group, a tert-butyl group, etc.

In the case where $R^7$ is a monovalent alicyclic group, examples of the monovalent alicyclic group include a cycloalkyl group, etc. The carbon number of the monovalent alicyclic group is 3 to 12, preferably 6 to 9. The cycloalkyl group may be a monocyclic ring or a polycyclic ring.

In the case where $R^7$ is a monovalent aromatic group, examples of the monovalent aromatic group include an aryl group such as a phenyl group, a biphenyl group, a naphthyl group, etc. The carbon number of the monovalent aromatic group is 6 to 18, preferably 6 to 12.

Among these, from the viewpoint of the transparency of the polyester-based resin composition of the present invention, $R^7$ is preferably an alkyl group.

Also from the same viewpoint, preferably b=0, that is, it is desirable that the cyclohexane ring is not substituted with $R^7$.

The aliphatic group, the alicyclic group, and the aromatic group may be further substituted with a substituent.

Examples of the substituent include a halogen atom such as a chlorine atom, a bromine atom, an iodine atom, etc.; a cyano group, a nitro group, an alkoxy group, an aryloxy group, an acyl group, an amino group, etc.

Specific examples of the compound represented by the above formula (5) include 1,2-cyclohexanediol, 1,3-cyclohexanediol, 1,4-cyclohexanediol, 1,2-cyclohexanedimethanol, 1,3-cyclohexanedimethanol, and 1,4-cyclohexanedimethanol, and above all, 1,3-cyclohexanedimethanol and 1,4-cyclohexanedimethanol are preferred.

In the case where the polyester resin (A2) has a diol unit having an alicyclic hydrocarbon structure, the content of the alicyclic hydrocarbon structure-having diol unit is, from the viewpoint of maintaining molding workability, preferably 3 to 60 mol % relative to the total amount of the diol unit, more preferably 10 to 55 mol %, even more preferably 20 to 50 mol %.

The dicarboxylic acid component to constitute the dicarboxylic acid unit having an alicyclic hydrocarbon structure, which may be contained in the polyester resin (A2), is preferably a compound represented by the following formula (6).

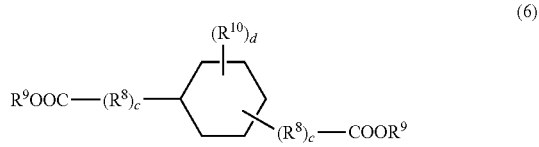

In the above formula (6), $R^8$ each independently represents a divalent aliphatic group having 1 to 10 carbon atoms, $R^9$ each independently represents a hydrogen atom, a methyl group, an ethyl group or an isopropyl group, and $R^{10}$ represents a monovalent organic group selected from the group consisting of a monovalent aliphatic group having 1 to 10 carbon atoms, a monovalent alicyclic group having 3 to 12 carbon atoms or a monovalent aromatic group having 6 to 18 carbon atoms. c indicates 0 or 1, and when c=0, the group —COORS directly bonds to the cyclohexane ring. d indicates an integer of 0 to 4, and is preferably 0 from the viewpoint of the transparency of the resin composition of the present invention. In the case where d is an integer of 2 or more, a plural of $R^{10}$'s may be identical, or different.

As specific examples of the divalent aliphatic group, the divalent alicyclic group and the divalent aromatic group, there are mentioned those exemplified hereinabove for $R^6$ in the formula (5), and the preferred examples are also the same; and as specific examples of the monovalent aliphatic group, the monovalent alicyclic group and the monovalent aromatic group, there are mentioned those exemplified hereinabove for $R^7$ in the formula (5), and the preferred examples are also the same.

Specific examples of the compound represented by the above formula (6) include 1,2-cyclohexanedicarboxylic acid, 1,3-cyclohexanedicarboxylic acid, 1,4-cyclohexanedicargoxylic acid and their esters, and above all, 1,3-cyclohexanedicarboxylic acid, 1,4-cyclohexanedicarboxylic acid and their esters are preferred.

In the case where the polyester resin (A2) has a dicarboxylic acid unit having an alicyclic hydrocarbon structure, the content of the alicyclic hydrocarbon structure-having dicarboxylic acid unit is, from the viewpoint of molding workability, preferably 3 to 60 mol % relative to the total amount of the dicarboxylic acid unit, more preferably 10 to 55 mol %, even more preferably 20 to 55 mol %.

The polyester resin (A2) may have both a diol unit having an alicyclic hydrocarbon structure and a dicarboxylic acid unit having an alicyclic hydrocarbon structure, however it is preferable that the polyester resin (A2) has a diol unit having an alicyclic hydrocarbon structure or a dicarboxy acid unit having an alicyclic hydrocarbon structure, and it is more preferable that the polyester resin (A2) has a diol unit having an alicyclic hydrocarbon structure. In the case where the polyester resin (A2) has both a diol unit having an alicyclic hydrocarbon structure and a dicarboxylic acid unit having an alicyclic hydrocarbon structure, the content of the structural unit having an alicyclic hydrocarbon structure is, from the viewpoint of maintaining molding workability and from the viewpoint of the gas-barrier property of the molded article formed of the polyester-based resin composition, preferably 1.5 to 30 mol % relative to the total amount of the dicarboxylic acid unit and the diol unit, more preferably 5 to 27.5 mol %, even more preferably 10 to 27.5 mol %.

As the other diol unit than the alicyclic hydrocarbon structure-having diol unit that may be contained in the polyester resin (A2), the resin may contain an aliphatic diol unit and an aromatic diol unit, and preferably contains an aliphatic diol unit.

In the case where the polyester resin (A2) contains an aliphatic diol unit, the content of the aliphatic diol unit is, from the viewpoint of the easiness in drying before use, preferably 40 mol % or more relative to the total amount of the diol unit, more preferably 45 mol % or more. The upper limit of the aliphatic diol unit content is, in the case where the polyester resin (A2) does not have an alicyclic hydrocarbon structure-having diol unit, preferably 100 mol % or less relative to the total amount of the diol unit, but in the case where the polyester resin (A2) has an alicyclic hydrocarbon structure-having diol unit, the upper limit is preferably 97 mol % or less relative to the total amount of the diol unit, more preferably 90 mol % or less, even more preferably 80 mol % or less.

The carbon number of the aliphatic diol unit that may be contained in the polyester resin (A2) is preferably 2 to 24, more preferably 2 to 12, even more preferably 2 to 6. Specific examples of the compound capable of constituting the aliphatic diol unit include ethylene glycol, 1,2-propylene glycol, 1,3-propylene glycol, 1,4-butylene glycol, diethylene glycol, trimethylene glycol, 1,2-butylene glycol, 1,3-butylene glycol, 2,3-butylene glycol, 1,5-pentanediol, neopentyl glycol, 1,6-hexanediol, etc. Ethylene glycol, propylene glycol and 1,4-butylene glycol are preferred, and ethylene glycol is more preferred.

The carbon number of the aromatic diol unit that may be contained in the polyester resin (A2) is preferably 6 to 24, more preferably 6 to 20. Specific examples of the compound capable of constituting the aromatic diol unit include hydroquinone, 4,4'-dihydroxybiphenyl, 1,4-bis(β-hydroxyethoxy)benzene, bis [4-(2-hydroxyethoxy)phenyl]sulfone, bis(p-hydroxyphenyl) ether, bis(p-hydroxyphenyl) sulfone, bis(p-hydroxyphenyl)methane, 1,2-bis(p-hydroxyphenyl)ethane, bisphenol A, bisphenol C, 2,5-naphthalenediol, and diols prepared by adding ethylene oxide to these diols, etc.

The polyester resin (A2) may contain the above-mentioned monoalcohol unit and polyalcohol unit within a range not detracting from the advantageous effects of the present invention.

The polyester resin (A2) for use in the present invention may contain an aromatic dicarboxylic acid unit and a linear or branched aliphatic dicarboxylic acid unit as a dicarboxylic acid unit except a dicarboxylic acid unit having an alicyclic hydrocarbon structure, and preferably contains an aromatic dicarboxylic acid unit.

In the case where the polyester resin (A2) contains an aromatic dicarboxylic acid unit, the content of the aromatic dicarboxylic acid unit is, relative to the total amount of the dicarboxylic acid unit, preferably 50 mol % or more, more preferably 60 mol % or more, even more preferably 70 mol % or more. The upper limit of the aromatic dicarboxylic acid unit is, in the case where the polyester resin (A2) does not have a dicarboxylic acid unit having an alicyclic hydrocarbon structure, preferably 100 mol % or less relative to the total amount of the dicarboxylic acid unit, but in the case where the polyester resin (A2) contains an alicyclic hydrocarbon structure-having dicarboxylic acid unit, the upper limit is preferably 99.5 mol % or less relative to the total amount of the dicarboxylic acid unit.

As a compound capable of constituting the aromatic dicarboxylic acid unit that may be contained in the polyester resin (A2), there can be used a dicarboxylic acid and a derivative thereof having an aromatic nucleus such as benzene, naphthalene, anthracene, biphenyl, diphenylether, diphenyl sulfone, diphenyl methane, etc. Examples of the aromatic dicarboxylic acid include esters to be formed of an aromatic dicarboxylic acid and an alcohol having 1 to 3 carbon atoms.

Among these, terephthalic acid, isophthalic acid, naphthalenedicarboxylic acids such as 1,3-naphthalenedicarboxylic acid, 1,4-naphthalenedicarboxylic acid, 1,5-naphthalenedicarboxylic acid, 2,6-naphthalenedicarb oxylic acid, 2,7-naphthalenedicarboxylic acid, etc., 4,4'-biphenyldicarboxylic acid, 3,4'-biphenyldicarboxylic acid, 4,4'-biphenylsulfonedicarboxylic acid, 4,4'-biphenyletherdicarboxylic acid, 1,2-bis(phenoxy)ethane-p,p'-dicarboxylic acid, anthracenedicarboxylic acid, etc., and $C_{1-3}$ short-chain alkyl esters thereof are preferred; terephthalic acid, isophthalic acid, 2,6-naphthalenedicarboxylic acid, 4,4'-biphenyldicarboxylic acid and their methyl esters and ethyl esters are more preferred; terephthalic acid, isophthalic acid and their methyl esters are even more preferred; and terephthalic acid is most preferred.

Specific examples of the compound capable of constituting the linear or branched aliphatic dicarboxylic acid unit that may be contained in the polyester resin (A2) includes succinic acid, glutaric acid, adipic acid, pimellic acid, suberic acid, azelaic acid, sebacic acid, dodecanedicarboxylic acid, etc.

The polyester resin (A2) may contain a monocarboxylic acid unit described in the aforementioned polyester resin (A1), a tri- or higher poly-carboxylic acid unit, a carboxylic acid anhydride unit and the like, within a range not detracting from the advantageous effects of the present invention.

The polyester resin (A2) is obtained through polycondensation of a dicarboxylic acid component to constitute a dicarboxylic acid unit and a diol component to constitute a diol unit, and to its production, any known method of a direct esterification method or an interesterification method is applicable.

Examples of the polycondensation catalyst to be used in producing the polyester resin (A2) include known antimony compounds such as antimony trioxide, antimony pentoxide, etc., known germanium compounds such as germanium oxide, etc. If desired, the ester may be subjected to solid-phase polymerization according to a known conventional method for increasing the molecular weight thereof.

Preferred examples of the polyester resin (A2) in the present invention include poly(ethylene-1,4-cyclohexanedimethylene-terephthalate), poly(ethylene-1,3-cyclohexanedimethylene-terephthalate), poly(ethylene-1,4-cyclohexanedimethylene-isophthalate), poly(ethylene-1,3-cyclohexanedimehtylene-isophthalate), poly(ethylene-1,4-cyclohexanedimethylene-2,6-naphthalenedicarboxylate-terephthalate), poly(ethylene-1,4-cyclohexanedimethylene-terephthalate-4,4'-biphenyldicarboxylate), etc. Among these, from the viewpoint of gas-barrier property, transparency and availability, poly(ethylene-1,4-cyclohexanedimehtylene-terephthalate) is preferred.

In the present invention, the glass transition temperature of the polyester resin (A) is 105° C. or lower. When the glass transition temperature of the polyester resin (A) is higher than 105° C., the compatibility thereof with the polyamide resin (B) and the polyester resin (R) lowers and in addition, the resin composition is poor in blow moldability, and therefore the gas-barrier property of the molded article to be obtained lowers and the transparency thereof lowers.

The glass transition temperature of the polyester resin (A) is preferably 80 to 105° C., more preferably 85 to 102° C., even more preferably 90 to 100° C.

In the present invention, the glass transition temperature of the resin may be determined according to the method described in the section of Examples, using the DSC curve thereof to be drawn using a differential scanning colorimeter.

The polyester resin (A) for use in the present invention is preferably dried before use so that the water content in the polymer could be preferably 200 ppm or less, more preferably 100 ppm or less, even more preferably 50 ppm or less.

The intrinsic viscosity of the polyester resin (A) for use in the present invention (as measured in a mixed solvent of phenol/1,1,2,2-tetrachloroethane=60/40 by mass, at 25° C.) is preferably 0.3 to 2.0 dL/g, more preferably 0.4 to 1.8 dL/g.

When the intrinsic viscosity falls within the above range, the molecular weight of the polyester could be sufficiently high and, in addition, the viscosity in melt could not be too high, and accordingly, there can be provided a resin composition having good molding workability. In addition, the mechanical properties of the molded article using the resin composition can also be improved.

The content of the polyester resin (A) in the polyester-based resin composition of the present invention is 0.5 to 15.0% by mass, preferably 1.0 to 13.0% by mass, more preferably 1.5 to 12.0% by mass, even more preferably 2.0 to 10.0% by mass, still more preferably 2.5 to 8.0% by mass.

When the content is less than 0.5% by mass, the molded article subjected to stretching treatment (hereinafter this may be referred to as "stretched body") could not have sufficient transparency. On the other hand, when the content is more than 15% by mass, the transparency of the stretched part of the stretched body could improve, but the transparency of the part having a low stretching draw ratio, such as a mouth or a bottom of a bottle, may lower, and in addition, such a large content would interfere with the gas-barrier property improving effect to be attained by incorporation of the polyamide resin (B), and therefore the molded articles to be formed could not have sufficient gas-barrier property.

Polyamide Resin (B)

The polyamide resin (B) for use in the present invention includes known polyamide resins produced through polycondensation of an ω-aminocarboxylic acid, a lactam or the like, or a diamine and a dicarboxylic acid as monomers.

Specific examples of ω-aminocarboxylic acid monomers include 6-aminocaproic acid, 11-aminoundecaoic acid, 12-aminododecanoic acid, etc., lactam monomers include ε-caprolactam, ω-laurolactam, etc. Examples of the other aromatic aminocarboxylic acids include para-aminomethylbenzoic acid.

Examples of diamine monomers include aliphatic diamines such as tetramethylenediamine, hexamethylenediamine, undecamethylenediamine, dodecamethylenediamine, 2,2,4-trimethylhexamethylenediamine, 2,4,4-trimethylmexamethylenediamine, 5-methylnonamethylenediamine, etc.; aromatic ring-having diamines such as metaxylylenediamine, paraxylylenediamine, etc.; alicyclic structure-having diamines such as 1,3-bis(aminomethyl)cyclohexane, 1,4-bis(aminomethyl)cyclohexane, 1-amino-3-aminomethylcyclohexane, bis(4-aminocyclohexyl)methane, bis(3-mehtyl-4-aminocyclohexyl)methane, 2,2-bis(4-aminocyclohexyl)propane, bis(aminopropyl)piperazine, aminoethylpiperazine, etc., to which, however, the monomers are not limited.

Examples of dicarboxylic acid monomers include aliphatic dicarboxylic acids such as succinic acid, glutaric acid, adipic acid, pimellic acid, suberic acid, azelaic acid, sebacic acid, dodecanedicarboxylic acid, etc.; alicyclic structure-having dicarboxylic acids such as cyclohexanedicarboxylic acid, decalindicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)-2,4,8,10-tetraoxaspiro[5.5]undecane, etc.; aromatic ring-having dicarboxylic acids such as terephthalic acid, isophthalic acid, phthalic acid, 2-methylphthalic acid, naphthalenedicarboxylic acid, biphenyldicarboxylic acid, tetralindicarboxylic acid, etc.; and their short-chain alkyl esters, etc., to which, however, the monomers are not limited. Concretely, in the short-chain alkyl esters, the alkyl group may have 1 to 3 carbon atoms, including methyl esters, ethyl esters, propyl esters and isopropyl esters. Above all, methyl esters are preferred.

Within a range not detracting from the advantageous effects of the present invention, a tri- or higher polycarboxylic acid such as trimellitic acid, trimesic acid, pyromellitic acid, tricarbaryl acid or the like may also be used.

Further, within a range not detracting from the advantageous effects of the present invention, a monocarboxylic acid such as benzoic acid, propionic acid, butyric acid or the like may also be used.

Among the above-mentioned polyamide resins, from the viewpoint of imparting the effect of improving gas-barrier property, a polyamide resin (B1) having a diamine unit containing a metaxylylenediamine unit in an amount of 70 mol % or more and a dicarboxylic acid unit containing an α,ω-aliphatic dicarboxylic acid in an amount of 70 mol % or more is preferred.

Polyamide Resin (B1)

The diamine unit in the polyamide resin (B1) contains a metaxylylenediamine unit preferably in an amount of 70 mol % or more, more preferably 80 mol % or more, even more preferably 90 to 100 mol %. When the metaxylylenediamine unit accounts for at least 70 mol % of the diamine unit, the gas-barrier property of the polyamide to be obtained can be efficiently enhanced.

Examples of the compound capable of constituting other diamine units than metaxylylenediamine units include aromatic ring-having diamines such as paraxylylenediamine, etc.; alicyclic structure-having diamines such as 1,3-bis(aminomethyl) cyclohexane, 1,4-bis(aminomethyl)cyclohexane, etc.; aliphatic diamines such as tetramethylenediamine, hexamethylenediamine, nonamethylenediamine, 2-methyl-1,5-pentanediamine, etc., to which, however, the compound is not limited.

Within a range not detracting from the advantageous effects of the present invention, a tri- or higher polyamine such as bis(hexamethylene)triamine or the like may also be used.

Further, within a range not detracting from the advantageous effects of the present invention, a monoamine such as butylamine, hexylamine, octylamine or the like may also be used.

The dicarboxylic acid unit in the polyamide resin (B1) contains an α,ω-aliphatic dicarboxylic acid unit preferably in an amount of 70 mol % or more, more preferably 75 mol % or more, even more preferably 80 to 100 mol %. When the content of the α,ω-aliphatic dicarboxylic acid unit is 70 mol % or more, it is possible to evade reduction in gas-barrier property and excessive reduction in crystallinity.

The α,ω-aliphatic dicarboxylic acid that is to be a starting material includes suberic acid, adipic acid, azelaic acid, sebacic acid, etc. Adipic acid and sebacic acid are preferred, and adipic acid is more preferred.

Examples of the other dicarboxylic acid unit than the α,ω-aliphatic dicarboxylic acid unit include structural units derived from alicyclic dicarboxylic acids such as 1,3-cyclohexanedicarboxylic acid, 1,4-cyclohexanedicarboxylic acid, etc., and structural units derived from aromatic dicarboxylic acids such as terephthalic acid, isophthalic acid, orthophthalic acid, xylylenedicarboxylic acid, naphthalenedicarboxylic acid, etc., to which, however, the unit is not limited.

As the unit constituting the polyamide resin (B1) except the above-mentioned diamine unit and dicarboxylic acid unit and within a range not detracting from the advantageous effects of the present invention, structural units derived from lactams such as ε-caprolactam, laurolactam, etc., aliphatic aminocarboxylic acids such as aminocaproic acid, aminoundecanoic acid, etc., as well as structural units derived from aromatic aminocarboxylic acids such as para-aminomethylbenzoic acid and the like can also be used as copolymerization units.

Specific examples of the polyamide resin (B) include polymetaxylyleneadipamide (polyamide MXD6), polyparaxylyleneadipamide, polycaproamide (nylon 6), polyhexamethyleneadipamide (nylon 66), polyhexamethylenesebacamide (nylon 610), polyundecamethyleneadipamide (nylon 116), polyhexamethylenedodecamide (nylon 612), polyundecanamide (nylon 11), polydodecanamide (nylon 12), isophthalic acid-copolymerized polymetaxylyleneadipamide (polyamide MXD6I) and their copolymerization amides (for example, nylon 66/6 (copolymer of nylon 66 and nylon 6)), etc. One alone or two or more of these polyamides may be used either singly or as combined.

Preferably, the polyamide resin (B) is produced according to a melt polycondensation (melt polymerization) method.

The melt polycondensation method is, for example, a method of heating a nylon salt formed of a diamine and a dicarboxylic acid in the presence of water and under pressure, followed by polymerization in a molten state thereof while added water and condensation water are removed.

The resin may also be produced according to a polycondensation method of directly adding a diamine to a molten dicarboxylic acid. In this case, for maintaining the reaction system in a uniform liquid state, preferably, the polycondensation is carried out in such a manner that the diamine is continuously added to the dicarboxylic acid, and during this, the reaction system is heated so that the reaction temperature could not be lower than the melting point of the produced oligoamide and polyamide.

A phosphorus atom-containing compound may be added to the polycondensation system for the polyamide resin (B), for realizing the effect of promoting the amidation reaction and for realizing the effect of preventing discoloration during polycondensation.

The phosphorus atom-containing compound includes dimethylphosphine acid, hypophosphorous acid, sodium hypophosphite, potassium hypophosphite, lithium hypophosphite, calcium hypophosphite, ethyl hypophosphite, phenylphosphonous acid, sodium phenylphosphonite, ethyl phenylphosphonite, phenylphosphonic acid, ethylphosphonic acid, sodium phenylphosphonate, diethyl phenylphosphonate, sodium ethylphosphonate, potassium ethylphosphonate, phosphorous acid, sodium hydrogenphosphite, sodium phosphite, potassium phosphite, calcium phosphite, triethyl phosphite, triphenyl phosphite, pyrophosphorous acid, etc., to which, however, the compound is not limited.

Among these, from the viewpoint that the effect of promoting amidation reaction is high and that the compound is excellent in the effect of preventing discoloration, metal hypophosphites such as sodium hypophosphite, potassium hypophosphite, lithium hypophosphite, calcium hypophosphite and the like are preferred, and sodium hypophosphite is more preferred.

The amount of the phosphorus atom-containing compound to be added to the polycondensation system for the polyamide resin (B) is, as a phosphorus atom-equivalent concentration in the polyamide resin (B), preferably 1 to 500 ppm, more preferably 5 to 450 ppm, even more preferably 10 to 400 ppm. When the amount of the phosphorus atom-containing compound to be added falls within the above range, the polyamide can be prevented from discoloring and gelling during polycondensation, and therefore the appearance of the molded article can be kept good.

Preferably, an alkali metal compound and/or an alkaline earth metal compound are added to the polycondensation system for the polyamide resin (B), along with the phosphorus atom-containing compound. For preventing the polyamide from discoloring during polycondensation, a sufficient amount of a phosphorus atom-containing compound must exist in the system, but as the case may be, the compound may promote gelation of polyamide, and therefore for controlling the amidation reaction speed, it is desirable to add an alkali metal compound or an alkaline earth metal compound to the system. For example, there are mentioned alkali metal/alkaline earth metal hydroxides such as lithium hydroxide, sodium hydroxide, potassium hydroxide, magnesium hydroxide, calcium hydroxide, barium hydroxide, etc., and alkali metal/alkaline earth metal acetates such as lithium acetate, sodium acetate, potassium acetate, magnesium acetate, calcium acetate, barium acetate, etc., to which, however, the compound is not limited.

In the case where an alkali metal compound and/or an alkaline earth metal compound are added to the polycondensation system for the polyamide resin (B), preferably, the value calculated by dividing the molar number of the compound by the molar number of the phosphorus atom-containing compound in the system could be 0.5 to 2.0, more preferably 0.6 to 1.8, even more preferably 0.7 to 1.5. When the value falls within the above range, it is possible to realize the amidation reaction-promoting effect by the phosphorus atom-containing compound and to prevent gelation.

The polyamide resin (B) produced through melt polycondensation is once taken out, then pelletized, dried and used. For further increasing the polymerization degree, the resin may be subjected to solid-phase polymerization.

No particular limitation is imposed on the heating apparatus for carrying out drying and solid-phase polymerization, and any known apparatus may be employed by a known method. Examples of the heating apparatus which may be suitably employed in the invention include a continuous mode heating drier; a rotary drum heating apparatus called a tumble drier, a conical drier, a rotary drier, etc.; and a conical heating apparatus having agitation blades therein, called Nauta mixer.

Particularly when solid-phase polymerization of polyamide is carried out, among the aforementioned apparatuses, a rotary drum heating apparatus is preferably employed, since the rotary drum heating apparatus realizes complete closure of the system, to thereby carry out polycondensation in a state where oxygen, a coloring causal substance, is removed.

The polyamide resin (B) produced through the aforementioned steps is less colored and undergoes less gelation. In the present invention, the polyamide resin produced through the aforementioned steps preferably has a color difference test b* value of JIS-K-7105 of 5 or less, more preferably 3 or less, further preferably 1 or less. When the polyamide has a b* value of 5 or less, a molded article obtained through processing the resin exhibits suppressed yellowing, which ensures the value of the product.

Among indices of the polymerization degree of the polyamide resin (B), relative viscosity is generally employed.

Preferably, the polyamide resin (B) has a relative viscosity of 1.5 to 4.2, more preferably 1.6 to 3.6, even more preferably 1.7 to 2.8, further preferably 1.9 to 2.3.

Through controlling the relative viscosity of the polyamide resin (B) to meet the above conditions, consistent moldability can be attained, to thereby produce molded articles of favorable appearance.

In the present invention, the relative viscosity of the polyamide resin (B) means the value measured according to the method described in the section of Examples.

The content of the polyamide resin (B) relative to the total amount of the polyester-based resin composition of the present invention is preferably 0.5 to 10.0% by mass, more preferably 1.0 to 8.0% by mass, even more preferably 2.0 to 6.0% by mass.

When the content is less than 0.5% by mass, the gas-barrier property of the molded article using the polyester-based resin composition of the present invention is insufficient. On the other hand, when the content is more than 10.0% by mass, the transparency of the molded article using the polyester-based resin composition of the present invention is not good.

Polyester Resin (R)

In the polyester resin (R), 70 mol % or more of the dicarboxylic acid unit is derived from an aromatic dicarboxylic acid and 70 mol % or more of the diol unit is derived from an aliphatic diol. The polyester resin (R) excludes the polyester resin (A). A polyester resin, in which 70 mol % or more of the dicarboxylic acid unit is derived from an aromatic dicarboxylic acid and 70 mol % or more of the diol unit is derived from an aliphatic diol and which has a cyclic acetal structure or an alicyclic hydrocarbon structure, corresponds to the polyester resin (A).

Examples of the aromatic dicarboxylic acid include terephthalic acid, isophthalic acid, orthophthalic acid, biphenyl-dicarboxylic acid, diphenylether-dicarboxylic acid, diphenylsulfone-dicarboxylic acid, diphenylketone-dicarboxylic acid, 2,6-naphthalenedicarboxylic acid, 1,4-naphthalenedicarboyxlic acid, 2,7-naphthalenedicarboxylic acid, etc. Terephthalic acid, isophthalic acid, orthophthalic acid, naphthalenedicarboxylic acid and 4,4'-biphenyldicarboxylic acid are preferred, and terephthalic acid is more preferred.

Examples of the aromatic dicarboxylic acid also include sulfophthalic acid and sulfophthalic acid metal salts. The sulfophthalic acid metal salt is a metal salt of sulfophthalic acid. Examples of the metal atom include an alkali metal such as lithium, sodium, potassium, etc., an alkaline earth metal such as beryllium, magnesium, calcium, strontium, etc., and zinc. Among these, alkali metals are preferred, sodium and lithium are more preferred, and sodium is even more preferred.

In the sulfophthalic acid and sulfophthalic acid metal salt, the two carboxyl groups may bond in any position of an ortho-position, a meta-position or a para-position, but preferably, they bond in a meta- or para-position, more preferably in a meta-position. Specifically, sulfoterephthalic acid, sulfoisophthalic acid, sulfoterephthalic acid metal salts or sulfoisophthalic acid metal salts are preferred, and sulfoisophthalic acid or sulfoisophtalic acid metal salts are more preferred.

The sulfophthalic acid and sulfophthalic acid metal salts may be substituted, and examples of the substituent include a substituted or unsubstituted alkyl group, and a substituted or unsubstituted aryl group. The carbon number of the alkyl group is preferably 1 to 8, more preferably 1 to 6, even more preferably 1 to 4. Specifically, examples of the group include a methyl group, an ethyl group, an n-propyl group, an isopropyl group, an n-butyl group, a t-butyl group, an n-octyl group, a 2-ethylhexyl group. The aryl group is preferably an aryl group having a carbon number of 6 to 12. Examples of the group include a phenyl group and a naphthyl group, and a phenyl group is preferred.

Specifically, examples of the sulfophthalic acid and the sulfophthalic acid metal salt include 5-sulfoisophthalic acid, sodium 5-sulfoisophthalate, lithium 5-sulfoisophthalate, potassium 5-sulfoisophthalate, calcium bis(5-sulfoisophthalate), sodium dimethyl 5-sulfoisophthalate, sodium diethyl 5-sulfoisophthalate, etc.

In the case where the polyester resin (R) contains a structural unit derived from at least one selected from the group consisting of a sulfophthalic acid and a sulfophthalic acid metal salt, preferably, the resin contains a structural unit derived from at least a sulfophthalic acid metal salt.

The content of the structural unit derived from a sulfophthalic acid and a sulfophthalic acid metal salt in the polyester resin (R) is 0.01 to 15 mol % of the entire structural unit derived from a dicarboxylic acid, more preferably 0.03 to 10.0 mol %, even more preferably 0.06 to 5.0 mol %, still more preferably 0.08 to 1.0 mol %.

The aliphatic diol includes a linear or branched aliphatic diol such as ethylene glycol, 2-butene-1,4-diol, trimethylene glycol, tetramethylene glycol, hexamethylene glycol, neopentyl glycol, methylpentanediol, diethylene glycol, etc. Among these, ethylene glycol and neopentyl glycol are preferred, and ethylene glycol is more preferred.

In the polyester resin (R) for use in the present invention, 70 mol % or more of the structural unit derived from a dicarboxylic acid (dicarboxylic acid unit) is a structural unit derived from an aromatic dicarboxylic acid, and 70 mol % or more of the structural unit derived from a diol (diol unit) is derived from an aliphatic diol.

Preferably, 80 mol % or more of the dicarboxylic acid unit is a structural unit derived from an aromatic dicarboxylic acid, and even more preferably 90 mol % or more is a structural unit derived from an aromatic dicarboxylic acid.

Also preferably, 80 mol % or more of the diol unit is a structural unit derived from an aliphatic diol, and more preferably, 90 mol % or more is a structural unit derived from an aliphatic diol.

More preferably, in the polyester resin (R), 70 mol % or more of the dicarboxylic acid unit is a structural unit derived from terephthalic acid and 70 mol % or more of the diol unit is a structural unit derived from ethylene glycol, even more preferably, 80 mol % or more of the dicarboxylic acid unit is a structural unit derived from terephthalic acid and 80 mol % or more of the diol unit is a structural unit derived from ethylene glycol, still more preferably, 90 mol % or more of the dicarboxylic acid unit is a structural unit derived from terephthalic acid and 90 mol % or more of the diol unit is a structural unit derived from ethylene glycol.

In the following description, the polyester resin in which 70 mol % or more of the dicarboxylic acid unit is a structural unit derived from terephthalic acid and 70 mol % or more of the diol unit is a structural unit derived from ethylene glycol may be referred to as polyethylene terephthalate.

When the proportion of the unit derived from terephthalic acid in the dicarboxylic acid unit is 70 mol % or more, as described above, the polyester resin could hardly be amorphous, and accordingly, in the case where the molded article using the resin composition of the present invention is used as a hollow container, it could hardly undergo thermal shrinkage even when a high-temperature material is filled therein, and the molded article could have good heat resistance.

In the case where polyethylene terephthalate is used as the polyester resin, the polyester resin other than the polyester resin (A) may be composed of polyethylene terephthalate alone but may contain any other polyester resin than polyethylene phthalate, in addition to polyethylene terephthalate. Preferably, polyethylene terephthalate is contained in an amount of 80 to 100% by mass, more preferably 90 to 100% by mass relative to the total amount of the polyester resin other than the polyester resin (A).

Polyethylene terephthalate may contain a structural unit derived from any other difunctional compound than terephthalic acid and ethylene glycol, and the difunctional compound includes the above-mentioned aromatic dicarboxylic acids and aliphatic diols except terephthalic acid and ethylene glycol, as well as other difunctional compounds than aromatic dicarboxylic acids and aliphatic diols. In this case, the structural unit derived from the other difunctional compound than terephthalic acid and ethylene glycol accounts for preferably 20 mol % or less relative to the total mol of the entire structural unit constituting the polyester resin (R), more preferably 10 mol % or less.

Even in the case where the polyester resin (R) is any other than polyethylene terephthalate, the resin may contain a structural unit derived from any other difunctional compound than aromatic dicarboxylic acids and aliphatic diols.

The other difunctional compound than aliphatic diols and aromatic dicarboxylic acids includes other aliphatic difunctional compounds than aliphatic diols and other aromatic difunctional compound than aromatic dicarboxylic acids, etc.

The other aliphatic difunctional compound than aliphatic diols includes linear or branched aliphatic difunctional compounds, concretely aliphatic dicarboxylic acids such as malonic acid, succinic acid, adipic acid, azelaic acid, sebacic acid, etc., aliphatic hydroxycarboxylic acids such as 10-hydroxyoctadecanoyl acid, lactic acid, hydroxyacrylic acid, 2-hydroxy-2-mehtylpropionic acid, hydoxybutyric acid, etc.

The other aromatic difunctional compound than aromatic dicarboxylic acids is not specifically limited, concretely including aromatic hydroxycarboxylic acids such as hydroxybenzoic acid, hydroxyltoluylic acid, hydroxynaphthoic acid, 3-(hydroxyphenyl)propionic acid, hydroxyphenylacetic acid, 3-hydroxy-3-phenylpropionic acid, etc., aromatic diols such as bisphenol compounds, hydroquinone compounds, etc., as well as alkylene oxide adducts of these compounds with ethylene oxide, propylene oxide or the like.

In the case where polyethylene terephthalate contains a structural unit derived from an aromatic dicarboxylic acid except sulfophthalic acid, sulfophthalic acid metal salts and terephthalic acid, the aromatic dicarboxylic acid is preferably selected from the group consisting of isophthalic acid, orthophthalic acid, naphthalenedicarboxylic acid and 4,4'-biphenyldicarboxylic acid. These are inexpensive and copolyester resins containing one of these are easy to produce. In the case where polyethylene terephthalate contains a structural unit derived from these aromatic dicarboxylic acids, the proportion of the aromatic dicarboxylic acid-derived structural unit is preferably 1 to 20 mol % of the dicarboxylic acid unit, more preferably 1 to 10 mol %.

Among these, isophthalic acid and naphthalenedicarboxylic acid are especially preferred aromatic dicarboxylic acids, and isophthlaic acid is most preferred. Polyethylene terephthalate containing an isophthalic acid-derived structural unit is excellent in moldability and is excellent in point of the ability thereof to prevent whitening of molded articles since the crystallization speed is retarded. In addition, polyethylene terephthalate containing a naphthalenedicarboxylic acid-derived structural unit can increase the glass transition temperature of the resin and can improve the heat resistance thereof, and further, can absorb UV rays, and is therefore favorably used for production of molded articles that are required to be resistant to UV rays. As the naphthalenedicarboxylic acid, 2,6-naphthalenedicarboxylic acid component is preferred as easy to produce and having high economic potential.

The polyester resin (R) may contain a structural unit derived from a monofunctional compound such as monocarboxylic acid, monoalcohol, etc. Specific examples of these compounds include aromatic monofunctional carboxylic acids such as benzoic acid, o-methoxybenzoic acid, m-methoxybenzoic acid, p-methoxybenzoic acid, o-methylbenzoic acid, m-methylbenzoic acid, p-methylbenzoic acid, 2,3-dimethylbenzoic acid, 2,4-dimethylbenzoic acid, 2,5-dimethylbenzoic acid, 2,6-dimethylbenzic acid, 3,4-dimethylbenzoic acid, 3,5-dimethylbenzoic acid, 2,4,6-trimethylbenzoic acid, 2,4,6-trimethoxybenzoic acid, 3,4,5-trimethoxybenzoic acid, 1-naphthoic acid, 2-naphthoic acid, 2-biphenylcarboxylic acid, 1-naphthaleneacetic acid, 2-naphthaleneacetic acid, etc.; aliphatic monocarboxylic acids such as propionic acid, butyric acid, n-octanoic acid, n-nonanoic acid, myristic acid, pentadecanoic acid, stearic acid, oleic acid, linoleic acid, linolenic acid, etc.; aromatic monoalcohols such as benzyl alcohol, 2,5-dimethylbenzyl alcohol, 2-phenethyl alcohol, phenol, 1-naphthol, 2-naphthol, etc.; aliphatic monoalcohols such as butyl alcohol, hexyl alcohol, octyl alcohol, pentadecyl alcohol, stearyl alcohol, polyethylene glycol monoalkyl ether, polypropylene glycol monoalkyl ether, polytetramethylene glycol monoalkyl ether, oleyl alcohol, etc.

Among these, from the viewpoint of easiness in polyester production and production cost, benzoic acid, 2,4,6-trimethoxybenzoic acid, 2-naphthoic acid, stearic acid and stearyl alcohol are preferred. The proportion of the monofunctional compound-derived structural unit is, relative to the total mol of the entire structural unit of the polyester resin (R), preferably 5 mol % or less, more preferably 3 mol % or less, even more preferably 1 mol % or less. The monofunctional compound functions as a terminal group of the polyester resin molecular chain or for blocking the terminal group of the molecular chain, thereby restraining the polyester resin (R) from having excessively high molecular weight and preventing gelation.

Further, for obtaining necessary properties, the polyester resin (R) may be copolymerized with a polyfunctional compound having at least 3 groups selected from a carboxyl group, a hydroxyl group and their ester-forming groups. Examples of the polyfunctional compound include aromatic polycarboxylic acids such as trimesic acid, trimellitic acid, 1,2,3-benzenetricarboxylic acid, pyromellitic acid, 1,4,5,8-naphthalenetetracarboxylic acid, etc.; aromatic polyalcohols such as 1,3,5-trihydroxybenzene, etc.; aliphatic polyalcohols such as trimethylolpropane, pentaerythritol, glycerin, etc.; aromatic hydroxycarboxylic acids such as 4-hydroxyisophthalic acid, 3-hydroxyisophthalic acid, 2,3-dihydroxybenzoic acid, 2,4-dihydroxybenzoic acid, 2,5-dihydroxybenzoic acid, 2,6-dihydroxybenzoic acid, protocatechuic acid, gallic acid, 2,4-dihydroxyphenylacetic acid, etc.; aliphatic hydroxycarboxylic acids such as tartaric acid, malic acid, etc.; and their esters.

The proportion of the polyfuncitonal compound-derived structural unit in the polyester resin (R) is preferably less than 0.5 mol % relative to the total molar number of the entire structural unit in the polyester.

Among the above-mentioned ones, preferred polyfunctional compounds are, from the viewpoint of reactivity and production cost, trimellitic acid, pyromellitic acid, trimesic acid, trimethylolpropane and pentaerythritol.

For production of the polyester resin (R), any known method of a direct esterification method or an interesterification method is applicable. Examples of the polycondensation catalyst to be used in producing the polyester resin (R) include known antimony compounds such as antimony trioxide, antimony pentoxide, etc., known germanium compounds such as germanium oxide, etc., known aluminum compounds such as aluminum chloride, etc., to which, however, the catalyst is not limited. As other production methods, there may be mentioned a method of interesterification with different types of polyester resins according to a method requiring long residence time and/or high-temperature extrusion.

The polyester resin (R) is a dimer of an ethylene glycol component, and may contain a small amount of a diethylene glycol side product unit to be produced in a small amount in the production step of the polyester resin. In order that the molded article could have good physical properties, the proportion of the diethylene glycol unit in the polyester resin is preferably as small as possible. The proportion of the diethylene glycol-derived structural unit is, relative to the entire structural unit in the polyester resin (R), preferably 3 mol % or less, more preferably 2 mol % or less, even more preferably 1 mol % or less.

The polyester resin (R) may contain a regenerated polyester resin or a material derived from a used polyester or an industrially-recycled polyester (for example, polyester monomer, catalyst and oligomer).

One alone or two or more of polyester resins (R) may be used either singly or as combined.

Though not specifically limited, the intrinsic viscosity of the polyester resin (R) is preferably 0.5 to 2.0 dL/g, more preferably 0.6 to 1.5 dL/g. When the intrinsic viscosity is 0.5 dL/g or more, the molecular weight of the polyester resin could be sufficiently high and therefore the molded article could express mechanical properties necessary for structural materials.

The intrinsic viscosity is measured as follows. The polyester resin to be analyzed is dissolved in a mixed solvent of phenol/1,1,2,2-tetrachloroethane (=60/40 by mass) to prepare 0.2, 0.4, and 0.6 g/dL solutions, and using an automatic viscometer (Viscotek, manufactured by Malvern Instruments Ltd.) at 25° C., the intrinsic viscosity thereof is measured.

The polyester-based resin composition of the present invention may contain any other component than the above-mentioned polyester resin (A), polyamide resin (B) and polyester resin (R), but preferably, the total content of the polyester resin (A), the polyamide resin (B) and the polyester resin (R) is preferably 50% by mass or more of the whole polyester-based resin composition, more preferably 70% by mass or more, even more preferably 80% by mass or more, further more preferably 90% by mass or more.

Examples of the other component that the polyester-based resin composition of the present invention may have include transition metals.

Transition Metal

Preferably, the polyester-based resin composition of the present invention contains a transition metal for the purpose of inducing oxidation of the polyamide resin (B) to increase the oxygen absorption function of the composition and to further enhance the gas-barrier property thereof.

As the transition metal, at least one selected from the group consisting of transition metals of Group VIII of the Periodic Table, manganese, copper and zinc. From the viewpoint of expressing oxygen absorption property, at least one selected from the group consisting of cobalt, iron, manganese and nickel is preferred, and cobalt is more preferred.

The transition metal may be used not only as a simple substance thereof but also in the form of a low-valence oxide, inorganic acid salt, organic acid salt or complex. The inorganic acid salt includes halides such as chlorides, bromides, etc., and carbonates, sulfates, nitrates, phosphates, silicates, etc. On the other hand, the organic acid salt includes carboxylates, sulfonates, phosphonates, etc. Transition metal complexes with β-diketones or β-keto acid esters may also be used.

In the present invention, from the viewpoint that the oxygen absorption property could be well exhibited, use of at least one selected from the group consisting of transition metal-containing carboxylates, carbonates, acetylacetonate complexes, oxides and halides is preferred, and use of at least one selected from the group consisting of octanoates, neodecanoates, naphthenates, stearates, acetates, carbonates and acetylacetonate complexes is more preferred, and use of cobalt carboxylates such as cobalt octenoate, cobalt naphthenate, cobalt acetate, cobalt stearate or the like is even more preferred.

One alone or two or more of the above transition metals may be used either singly or as combined.

The content of the transition metal in the polyester-based resin composition of the present invention is, from the viewpoint of enhancing the gas-barrier property, preferably 10 to 1,000 ppm, more preferably 20 to 500 ppm, even more preferably 50 to 300 ppm, still more preferably 80 to 200 ppm. In the case where a transition metal-containing carboxylate is used, the content of the transition metal means the content of the transition metal itself in the transition metal-containing compound.

Other Component

The polyester-based resin composition of the present invention may contain various additive components. Examples of the additive components include a colorant, a heat stabilizer, a light stabilizer, a moisture-proofing agent, a water-proofing agent, a lubricant, a spreading agent, etc. Within a range not overstepping the object of the present invention, the polyester-based resin composition may contain any other resin component than the polyester resin (A), the polyamide resin (B) and the polyester resin (R).

Method for Producing Polyester-Based Resin Composition

The production method for the polyester-based resin composition of the present invention includes a step of obtaining a master batch (M) containing the polyester resin (A) and the polyamide resin (B) (hereinafter this may be referred to as step 1), and a step of melt-kneading the master batch (M) with the polyester resin (R) to give a polyester-based resin composition (step 2), in that order.

(Step 1: Step of Obtaining Master Batch (M) Containing Polyester Resin (A) and Polyamide Resin (B)

In the step 1, a master batch (M) containing the polyester resin (A) and the polyamide resin (B) is obtained.

The master batch (M) contains at least the polyester resin (A) and the polyamide resin (B), preferably contains the polyester resin (A), the polyamide resin (B) and the polyester resin (R), and more preferably contains the polyester resin (A), the polyamide resin (B), the polyester resin (R) and a transition metal.

In the case where the master batch (M) does not contain the polyester resin (R), preferably, the content of the polyester resin (A) in the master batch (M) is 10 to 90% by mass, and the content of the polyamide resin (B) is 90 to 10% by mass, more preferably, the content of the polyester resin (A) is 20 to 80% by mass, and the content of the polyamide resin (B) is 80 to 20% by mass, and even more preferably, the content of the polyester resin (A) is 25 to 75% by mass, and the content of the polyamide resin (B) is 75 to 25% by mass.

In the case where the master batch (M) contains the polyester resin (R), preferably, the content of the polyester resin (A) in the master batch (M) is 3 to 90% by mass, and the content of the polyamide resin (B) is 3 to 90% by mass, more preferably, the content of the polyester resin (A) is 5 to 80% by mass, and the content of the polyamide resin (B) is 5 to 80% by mass, even more preferably, the content of the polyester resin (A) is 10 to 70% by mass, and the content of the polyamide resin (B) is 10 to 70% by mass, and further more preferably, the content of the polyester resin (A) is 20 to 70% by mass, and the content of the polyamide resin (B) is 10 to 40% by mass.

In the case where the master batch (M) contains the polyester resin (R), preferably, the content of the polyester resin (R) in the master batch (M) is 5% by mass or more, more preferably 10% by mass or more, even more preferably 15% by mass or more.

The master batch (M) preferably contains the polyester resin (R). When the master batch (M) contains the polyester resin (R), the molded article produced by the polyester-based resin composition may have more excellent transparency (haze).

The preparation method for the master batch (M) is not specifically limited. The master batch may be prepared by kneading the polyester resin (A), and the polyamide resin (B), preferably the polyester resin (A), the polyamide resin (B) and the polyester resin (R), more preferably the polyester resin (A), the polyamide resin (B), the polyester resin (R) and a transition metal.

The melt-kneading temperature is not specifically limited, but is preferably 220 to 290° C., more preferably 225 to 285° C., even more preferably 230 to 280° C.

The time for melt-kneading is not specifically limited, but is preferably 10 seconds to 5 minutes, more preferably 20 seconds to 4 minutes, even more preferably 30 seconds to 3 minutes.

The device for use for melt-kneading is not specifically limited, but is preferably an open-type mixing roll, a closed Bumbary mixer, a kneader, a continuous kneading machine (single-screw kneading machine, twin-screw kneading machine, multi-screw kneading machine, etc.) or the like.

Preferably, the master batch (M) is produced by melt-kneading a starting material containing the polyester resin (A) and the polyamide resin (B) followed by pelletizing the resultant mixture into pellets.

(Step 2: Step of Melt-Kneading Master Batch (M) and Polyester Resin (R) to Give Polyester-Based Resin Composition)

In the step 2, the master batch (M) obtained in the step 1 is melt-kneaded with the polyester resin (R) to prepare the polyester-based resin composition of the present invention.

The dilution ratio of the master batch (M) is preferably 2 to 50 times, more preferably 3 to 25 times, even more preferably 5 to 10 times.

When the dilution ratio falls within the above range, the molded article to be produced may have more excellent transparency.

Here, the dilution ratio of the master batch (M) is represented by X/Y, in which the content of the polyester resin (A) in the master batch (M) is represented by X % by mass, and the content of the polyester resin (A) in the polyester-based resin composition is represented by Y % by mass. It is assumed that the polyester resin (A) is not added in the step 2.

In the step 2, it is desirable that the polyester resin (A) and the polyamide resin (B) are not added, and preferably, the whole amount of the polyester resin (A) and the polyamide resin (B) is derived from the master batch (M).

In the case where the polyester-based resin composition contains a transition metal, the transition metal may be added in the step 2, but preferably, the transition metal is added in preparing the master batch (M) in the step 1.

In the step 2, after the master batch (M) and the polyester resin (R) may be previously mixed in a dry-blending mode, and then melt-kneaded. Also, the master batch (M) and the polyester resin (R) may be dry-blended and the resultant dry-blended mixture may be directly put into the molding machine such as an injection-molding machine or the like. In this case, in the molding machine, the master batch (M) and the polyester resin (R) are melt-kneaded, and this embodiment also corresponds to the step (2).

Further, it is possible that the master batch (M) and the polyester resin (R) each are metered through a feeder and then directly molded in a molding machine such as an injection-molding machine or the like.

Also it is possible that the master batch (M) and the polyester resin (R) are dry-blended and then melt-kneaded to give pellets of the polyester-based resin composition, and the resultant pellets may be molded.

The melt-kneading temperature in the step 2 is preferably 240 to 295° C., more preferably 245 to 292° C., even more preferably 250 to 290° C.

The time for melt-kneading is not specifically limited, but is preferably 1 second to 5 minutes, more preferably 3 seconds to 4 minutes, even more preferably 5 seconds to 3 minutes.

The device for use for melt-kneading is not specifically limited, but is preferably an open-type mixing roll, a closed Bumbary mixer, a kneader, a continuous kneading machine (single-screw kneading machine, twin-screw kneading machine, multi-screw kneading machine, etc.) or the like.

Production Method for Molded Article and Molded Article

The production method for the molded article of the present invention includes a step of molding the polyester-based resin composition of the present invention (polyester-based resin composition obtained according to the production method for the polyester-based resin composition of the present invention).

The molded article of the present invention contains the polyester-based resin composition of the present invention.

In the following description, the molded article obtained according to the production method for the molded article of the present invention, and the molded article of the present invention are referred to as "molded article of the present invention".

The method for producing the molded article of the present invention is not specifically limited, and any known method is employable.

For example, films or sheets of the polyester-based resin composition may be produced by extruding a melt of the polyester-based resin composition of the present invention by means of an extruder through a T die, a circular die, or the like. The thus-produced sheet may be stretched to provide a stretched film.

A bottle-shaped packaging container may be produced by injecting a melt of the polyester-based resin composition from an injection molding machine to a die, to thereby provide a preform, and blow-stretching the preform at a stretching temperature. The bottle-shaped packaging container may also be obtained according to a compression molding method, a compression blow-molding method or a compression-stretching blow-molding method.

The molding method for containers such as trays, cups and the like includes a method of injecting a melt of the polyester-based resin composition from an injection molding machine to a die, a method of molding a sheet through vacuum molding, pressure forming or vacuum/pressure forming or the like.

The molded article of the polyester-based resin composition of the present invention may be produced according to various methods, not limited to the above-mentioned production methods.

Preferably, the molded article of the present invention is a bottle, a cup or a film, and preferably, at least a part of the molded article is stretched in a draw ratio of 2 to 30 times, more preferably 3 to 25 times, even more preferably 5 to 20 times.

The molded article of the present invention may have a multi-layer structure having at least one layer of the polyester-based resin composition of the present invention. However, the molded article having a single-layer structure can realize excellent gas-barrier property and transparency, and therefore more preferably, the molded article of the present invention is a single-layered molded article, that is, a molded article formed of only the polyester-based resin composition of the present invention.

The molded article of the present invention has excellent transparency in any portion stretched at a high draw ratio or a low draw ratio.

The haze of the molded article of the present invention in the unstretched portion (where the draw ratio is 1) or in the portion stretched at a draw ratio of less than 5 times is preferably 5.0% or less, more preferably 4.2% or less, even more preferably 4.0% or less.

The haze of the molded article of the present invention in the portion stretched at a draw ratio of 5 to 20 times is preferably 5.0% or less, more preferably 4.2% or less, even more preferably 4.0% or less, still more preferably 3.7% or less.

The haze value of the molded article is one measured according to the method described in the section of Examples.

The molded article of the present invention has good gas-barrier property.

The oxygen transmission coefficient of the molded article of the present invention is, when not containing a transition metal, preferably 1.60 cc·mm/(m$^2$·day·atm) or less, more preferably 1.50 cc·mm/(m$^2$·day·atm) or less, even more preferably 1.40 cc·mm/(m$^2$·day·atm) or less, still more preferably 1.35 cc·mm/(m$^2$·day·atm) or less.

The oxygen transmission coefficient of the molded article of the present invention is, when containing a transition metal, preferably 0.10 cc·mm/(m$^2$·day·atm) or less, more preferably 0.07 cc·mm/(m$^2$·day·atm) or less, even more preferably 0.06 cc·mm/(m$^2$·day·atm) or less, still more preferably 0.04 cc·mm/(m$^2$·day·atm) or less.

The carbon dioxide transmission coefficient of the molded article of the present invention is preferably 34.0 cc·mm/(m$^2$·day) or less, more preferably 32.0 cc·mm/(m$^2$·day) or less, even more preferably 30.0 cc·mm/(m$^2$·day) or less, still more preferably 28.0 cc·mm/(m$^2$·day) or less.

The oxygen transmission coefficient and the carbon dioxide transmission coefficient of the molded article are values measured according to the description in the section of Examples.

In the present invention, the molded article is preferably a packaging container such as a bottle, a cup or the like, and more preferably a bottle.

The packaging container can be applied to keeping or storage of various goods. Examples of such goods include beverages, seasonings, edible oils, food grains, liquid and solid processed foods requiring aseptic packaging or heat sterilization, chemicals, liquid commodities, pharmaceuticals, semiconductor integrated circuits, electronic devices, etc.

Master Batch (M)

A preferred master batch of the present invention contains a polyester resin (A) having a cyclic acetal structure or an alicyclic hydrocarbon structure, a polyamide resin (B), and a polyester resin (R) in which 70 mol % or more of the dicarboxylic acid unit is derived from an aromatic dicarboxylic acid and 70 mol % or more of the diol unit is derived from an aliphatic diol.

The master batch (M) is favorably used in preparing the polyester-based resin composition of the present invention, and is the same as the master batch (M) prepared in the case where the master batch (M) contains the polyester resin (R) in the above-mentioned step 1.

The polyester resin (A), the polyamide resin (B) and the polyester resin (R) are the same component as those described hereinabove for the production method for the polyester-based resin composition of the present invention, and the preferred ranges thereof are also the same as those described there.

EXAMPLES

The present invention will next be described in more detail by way of examples, which should not be construed as limiting the invention thereto. Materials, analysis and measurement methods, and molded article production methods employed in the Examples and Comparative Examples are described below.

1. Materials

Polyester Resin (A)

Synthesis of Polyester A-1

In a reactor having an inner capacity of 30 L, equipped with a stirrer, a fractionator, a cooling trap can, a thermometer, a cooler, a catalyst tank, nitrogen introducing tube, a depressurized line, a vacuum pump, and a pressure regulating device, 13,313 g (69 mol) of dimethyl terephthalate (DMT), 6,664 g (107.5 mol) of ethylene glycol (EG), 5,108 g (16.7 mol) of 3,9-bis(1,1-dimethyl-2-hydroxyethyl) -2,4,8,10-tetraoxaspiro[5,5]undecane (SPG), and 0.03 mol, relative to 100 mol of DMT, of manganese acetate tetrahydrate were added, and heated up to 200° C. in a nitrogen atmosphere for interesterification. After the methanol distillation amount reached at least 90% of the theoretical value, 0.01 mol of antimony(III) trioxide and 0.06 mol of triphenyl phosphate (hereinafter this may be referred to as "TPP"), relative to 100 mol of DMT, were added, and the system was gradually depressurized while heated, and finally, it was polymerized at 280° C. under 0.1 kPa or less. After the melt viscosity reached a desired level, the reaction was ended to give a polyester (polyester A-1) containing 20 mol %, relative to the whole diol unit, of SPG residue. The SPG content in the polymer was determined through $^1$H-NMR (400 MHz).

The glass transition temperature of the polyester A-1 was 95° C. The intrinsic viscosity of the polyester A-1 was 0.65 dL/g.

Before use, this was dried in vacuum at 80° C. for 24 hours.

Synthesis of Polyester A-2

In the same manner as that for the polyester A-1 except that the charge-in quantities of EG and SPG were suitably changed, a polyester (polyester A-2) having 30 mol %, relative to the whole diol unit, of SPG residue and 70 mol %, relative to the whole diol unit, of EG residue was obtained.

The glass transition temperature of the polyester A-2 was 100° C. The intrinsic viscosity of the polyester A-2 was 0.65 dL/g.

Before use, this was dried in vacuum at 80° C. for 24 hours.

Synthesis of Polyester A-3

In the same manner as that for the polyester A-1 except that the charge-in quantities of EG and SPG were suitably changed, a polyester (polyester A-3) having 45 mol %, relative to the whole diol unit, of SPG residue and 55 mol %, relative to the whole diol unit, of EG residue was obtained.

The glass transition temperature of the polyester A-3 was 110° C. The intrinsic viscosity of the polyester A-3 was 0.65 dL/g.

Before use, this was dried in vacuum at 80° C. for 24 hours.

Polyamide Resin (B)

Polyamide Resin (B-1)

15 kg of adipic acid, and 15 g of sodium hypophosphite monohydrate were charged in a 50 L jacketed reactor equipped with a stirrer, a partial condenser, a cooler, a thermometer, an instillation tank and a nitrogen gas introduction duct, fully purged with nitrogen, and heated up to 180° C. in a small amount of a nitrogen stream atmosphere to thereby uniformly dissolve adipic acid, and then while the system was stirred, 13.8 kg of metaxylylenediamine was added dropwise thereto, taking 170 minutes. During this, the inner temperature was continuously elevated up to 245° C. Water formed through polycondensation was removed out of the system via the partial condenser and the cooler. After dropwise addition of metaxylylenediamine, the inner temperature was further elevated up to 260° C., the reaction was continued for 1 hour, and then the polymer was taken out as strands through the nozzle at the bottom of the reactor, cooled in water and pelletized into polymer pellets. Next, the polymer thus obtained through the operation was dried in vacuum at 100° C. for 48 hours to give dried and crystallized pellets. The relative viscosity of the resultant polyamide was 2.1.

Polyamide Resin (B-2)

15 kg of adipic acid, and 15 g of sodium hypophosphite monohydrate were charged in a 50 L jacketed reactor equipped with a stirrer, a partial condenser, a cooler, a thermometer, an instillation tank and a nitrogen gas introduction duct, fully purged with nitrogen, and heated up to 180° C. in a small amount of a nitrogen stream atmosphere to thereby uniformly dissolve adipic acid, and then while the system was stirred, 13.8 kg of metaxylylenediamine was added dropwise thereto, taking 170 minutes. During this, the inner temperature was continuously elevated up to 245° C. Water formed through polycondensation was removed out of the system via the partial condenser and the cooler. After dropwise addition of metaxylylenediamine, the inner temperature was further elevated up to 260° C., the reaction was continued for 1 hour, and then the polymer was taken out as strands through the nozzle at the bottom of the reactor, cooled in water and pelletized into polymer pellets.

Next, the polymer thus obtained through the operation was put into a 50-liter rotary tumbler equipped with a heated jacket, a nitrogen gas introducer dust and a vacuum line and while rotated, the system was depressurized and then restored to normal pressure with nitrogen having a purity of 99% by volume or more. This operation was repeated three times. Subsequently, the system was heated up to 140° C. in a nitrogen stream atmosphere. Next, the system was depressurized, and further continuously heated up to 190° C., kept at 190° C. or 30 minutes, and thereafter restored to normal pressure by introducing nitrogen thereinto, and cooled to give a polyamide. The relative viscosity of the resultant polyamide was 2.7.

Polyester Resin (H)

PET resin (trade name: Unipet BK-2180, manufactured by Unipet Company, intrinsic viscosity=0.83 dL/g, not having a metal sulfonate group) was used. Before use, this was dried in a dehumidification drier at 150° C. for 8 hours.

2. Analytical Method and Measurement Method (1) Intrinsic Viscosity of Polyester Resin According to JIS K7367-1:2002, polyester resin was dissolved in a mixed solvent of phenol/1,1,2,2-tetrachloroethane=60/40 (ratio by mass), and the intrinsic viscosity thereof was measured at 25° C. using an automatic viscometer (Viscotek, manufactured by Malvern Instruments Ltd.).

(2) Glass Transition Temperature of Polyester Resin

The glass transition temperature of polyester resin was measured using a differential scanning calorimeter (manufactured by Shimadzu Corporation, trade name: DSC/TA-60WS). About 10 mg of polyester resin was put in an unsealed aluminum container, heated up to 280° C. at a heating rate of 20° C./min in a nitrogen gas (30 mL/min) stream, melted and rapidly cooled to prepare a test sample. The sample was measured under the same condition, and the temperature changed by ½ from the base line difference before and after transition on the DSC curve is referred to as the glass transition temperature.

(3) Relative Viscosity of Polyamide Resin 0.2 g of polyamide resin was weighed accurately, and dissolved in 20 mL of 96 mass % sulfuric acid with stirring at 20 to 30° C. After completely dissolved, 5 mL of the solution was immediately taken in a Cannon-Fenske viscometer, left in a constant-temperature bath at 25° C. for 10 minutes, and then the dropping time (t) of the solution was measured. The dropping time ($t_0$) of 96 mass % sulfuric acid was measured similarly. Using the measured values of t and to, the relative viscosity of the polyamide resin was calculated according to the following equation.

$$\text{Relative Viscosity} = t/t_0$$

(4) Haze of Molded Article

The haze of the bottle produced in Examples and Comparative Examples was measured according to JIS K7136:2000.

The sample was the body of the bottle (at 80 mm from the bottom), and this was analyzed using a color-difference meter (manufactured by Nippon Denshoku Industries Co., Ltd., trade name COH-400, transmission method).

(5) Measurement of Oxygen Transmission Rate

An oxygen transmission rate measuring device (manufactured by MOCON Inc., trade name "OX-TRAN 2/61") was used.

100 mL of water was put into a 500-mL bottle produced in Examples and Comparative Examples, and under the condition at an oxygen partial pressure of 0.21 atm, 1-atm nitrogen was circulated inside the bottle at a flow rate of 20 mL/min, under the condition of a bottle inside humidity of 100% RH (relative humidity), an outside humidity of 50% RH and a temperature of 23° C., and after 200 hours, the oxygen amount in the nitrogen having been circulated inside the bottle was detected with a coulometric sensor to determine the oxygen transmission rate. The measured value of the oxygen transmission rate was converted into the oxygen transmission coefficient according to the following equation.

Oxygen transmission coefficient [cc·mm/(m²·day·atm)] =oxygen transmission rate [cc/(day·0.21 atm)]/0.21×bottle mean thickness [min]/surface area [m²] (surface area=0.04 m²)

The evaluation standards are as follows
—Sample Containing Transition Metal—
A: The oxygen transmission coefficient is 0.06 [cc·mm/(m²·day·atm)] or less.
B: The oxygen transmission coefficient is more than 0.06 [cc·mm/(m²·day·atm)] and 0.10 [cc·mm/(m²·day·atm)] or less.
C: The oxygen transmission coefficient is more than 1.60 [cc·mm/(m²·day·atm)].
—Sample not Containing Transition Metal—
A: The oxygen transmission coefficient is 1.35 [cc·mm/(m²·day·atm)] or less.
B: The oxygen transmission coefficient is more than 1.35 [cc·mm/(m²·day·atm)] and 1.60 [cc·mm/(m²·day·atm)] or less.
C: The oxygen transmission coefficient, more than 1.60 [cc·mm/(m²·day·atm)].

(6) Measurement of Carbon Dioxide Transmission Rate

A carbon dioxide measuring device (manufactured by MOCON Inc., trade name "PERMATRAN-C MODEL 10") was used.

After bottle production, 500 mL of water and 3.95 g of dry ice were put into each bottle in such a controlled manner that the carbon dioxide dissolution amount in water inside the bottle could be 4.0 gas volume, the bottle was capped and left in an environment at 23° C. and 50% RH (relative humidity) for 24 hours.

Subsequently, the carbon dioxide transmission rate of the bottle [cc/day] was measured, and converted into the carbon dioxide transmission coefficient according to the following equation.

Carbon dioxide transmission coefficient [cc·mm/(m²·day)]=carbon dioxide transmission rate [cc/day]×bottle mean thickness [mm]/surface area [m²](surface area=0.04 m²)

The evaluation standards are as follows.
A: The carbon dioxide transmission coefficient is 28.0 [cc·mm/(m²·day)] or less.
B: The carbon dioxide transmission coefficient is more than 28.0 [cc·mm/(m²·day)] and 32.0 [cc·mm/(m²·day)] or less.
C: The carbon dioxide transmission coefficient is more than 32.0 [cc·mm/(m²·day)].

Examples 1 to 6, and Comparative Example 4

Given amounts of the polyester resin (A), the polyamide resin (B), the polyester resin (R), and, as a transition metal, cobalt stearate (StCo) were mixed in a tumbler. Using a twin-screw extruder (manufactured by Toshiba Machine Co., Ltd., Model "TEM37-BS"), the mixture was melt-kneaded under the temperature condition of C1: 190° C., C2: 240° C., C3: 240° C., C4: 240° C., C5: 240° C., C6: 240° C. and H: 250° C., at a resin temperature of 235° C., at a screw rotation number of 200 rpm, and at a feeder speed of 12 kg/h to prepare pellets (master batch (M)).

The content of cobalt stearate in the Table is a content as cobalt (transition metal).

Given amounts of the master batch (M) and the polyester resin (R) were mixed at room temperature (25° C.) for 10 minutes, and the resultant mixture was put into a preform injection-molding machine (manufactured by Sumitomo Heavy Industries, Ltd., Model "SE130EV), and injection-molded under the condition mentioned below to give a single-layer preform.

The molding condition for the single-layer preform is as follows:

Two preforms were produced in one injection molding operation.
  Mass of one preform: 20.5 g
  Hot runner/cylinder temperature: 280° C.
  Hot runner nozzle temperature: 285° C.
  Mold cooling water temperature: 15° C.
  Molding cycle time: 25.9 sec Further, after cooled, the formed single-layer preform was blow-molded in a mode of biaxially stretching, using a blow-molding machine (manufactured by Frontier, Inc., Model "EFB-1000ET"), thereby giving a single-layer bottle (height: 223 mm, body diameter: 65 mm, volume: 500 mL, wall thickness: 250 μm, mass: 20.5 g). The mold was a 500-mL petaloid-bottomed one, and the pre-blowing surface temperature (surface temperature after preform heating) was 107 to 110° C.

The biaxially-stretching blow-molding condition is as follows.
  Preform heating temperature: 107 to 110° C.
  Pressure to stretching rod: 0.5 MPa
  Primary blow pressure: 0.5 MPa
  Secondary blow pressure: 2.5 MPa
  Primary blow delay time: 0.32 sec
  Primary blow time: 0.28 sec
  Secondary blow time: 2.0 sec
  Blow exhaust time: 0.6 sec
  Mold temperature: 30° C.

The single-layer bottles produced in the manner as above were measured to determine the physical properties thereof according to the above-mentioned methods. The results are shown in Table 1.

Comparative Example 1

A single-layer bottle was produced in the same manner as in Example 1 except that the polyester resin (R) alone was used, and tested to measure the physical properties thereof. The results are shown in Table 1.

Comparative Example 2

A single-layer bottle was produced in the same manner as in Example 1, except that the polyester resin (R) and the polyamide resin (B-1) were dry-blended and then put into the injection-molding machine, and tested to measure the physical properties thereof. The results are shown in Table 1.

Comparative Example 3

A single-layer bottle was produced in the same manner as in Example 1, except that the polyester resin (R) and the polyamide resin (B-2) were dry-blended and then put into the injection-molding machine, and tested to measure the physical properties thereof. The results are shown in Table 1.

Examples 7 to 12 and Comparative Examples 5 to 8

Single-layer bottles were produced in the same manner as in Examples 1 to 6 and Comparative Examples 1 to 4 except that the transition metal was not added thereto, and tested to measure the physical properties thereof. The results are shown in Table 2.

Comparative Examples 9 to 12

Single-layer bottles were produced in the same manner as in Example 1 except that the formulations were changed as in Table 3, and tested to measure the physical properties thereof. The results are shown in Table 3.

TABLE 1

|  |  |  | Example |  |  |  |  |  | Comparative Example |  |  |  |
|---|---|---|---|---|---|---|---|---|---|---|---|---|
|  |  |  | 1 | 2 | 3 | 4 | 5 | 6 | 1 | 2 | 3 | 4 |
| Composition of master batch (M) |  |  |  |  |  |  |  |  |  |  |  |  |
| Polyester resin (R) | Content | wt % | 40 | 10 | 25 | 0 | 40 | 40 | — | — | — | 40 |
| Polyester resin (A) | Kind | — | A-1 | A-1 | A-1 | A-1 | A-1 | A-2 | — | — | — | A-3 |
|  | Content | wt % | 30 | 60 | 60 | 70 | 30 | 30 | — | — | — | 30 |
|  | Tg | °C. | 95 | 95 | 95 | 95 | 95 | 100 | — | — | — | 110 |
| Polyamide resin (B) | Kind | — | B-1 | B-1 | B-1 | B-1 | B-2 | B-1 | — | — | — | B-1 |
|  | Content | wt % | 30 | 30 | 15 | 30 | 30 | 30 | — | — | — | 30 |
| Transition metal (Co) | Content | ppm | 1000 | 1000 | 500 | 1000 | 1000 | 1000 | — | — | — | 1000 |
| Dilution ratio |  |  |  |  |  |  |  |  |  |  |  |  |
| Master batch (M) | Content | wt % | 10 | 10 | 20 | 10 | 10 | 10 | — | — | — | 10 |
| Polyester resin (R) | Content | wt % | 90 | 90 | 80 | 90 | 90 | 90 | — | — | — | 90 |
| Polyester resin composition |  |  |  |  |  |  |  |  |  |  |  |  |
| Polyester resin (R) | Content | wt % | 94 | 91 | 85 | 90 | 94 | 94 | 100 | 97 | 97 | 94 |
| Polyester resin (A) | Kind | — | A-1 | A-1 | A-1 | A-1 | A-1 | A-2 | — | — | — | A-3 |
|  | Content | wt % | 3 | 6 | 12 | 7 | 3 | 3 | 0 | 0 | 0 | 3 |
| Polyamide resin (B) | Kind | — | B-1 | B-1 | B-1 | B-1 | B-2 | B-1 | — | B-1 | B-2 | B-1 |
|  | Content | wt % | 3 | 3 | 3 | 3 | 3 | 3 | 0 | 3 | 3 | 3 |
| Transition metal (Co) | Content | ppm | 100 | 100 | 100 | 100 | 100 | 100 | 100 | 100 | 100 | 100 |
| Measurement results |  |  |  |  |  |  |  |  |  |  |  |  |
| Bottle | Haze | % | 2.3 | 2.9 | 3.1 | 3.9 | 4.6 | 4.0 | 0.4 | 5.2 | 6.0 | 9.2 |
|  | Oxygen transmission coefficient | (*1) | A | A | A | A | A | B | C | A | A | B |
|  | Carbon dioxide transmission coefficient | (*2) | A | B | B | A | A | B | C | A | A | C |

(*1) Unit of oxygen transmission coefficient: cc · mm/(m² · day · atm)
(*2) Unit of carbon dioxide transmission coefficient: cc · mm/(m² · day)

TABLE 2

|  |  |  | Example |  |  |  |  |  | Comparative Example |  |  |  |
|---|---|---|---|---|---|---|---|---|---|---|---|---|
|  |  |  | 7 | 8 | 9 | 10 | 11 | 12 | 1 | 2 | 3 | 4 |
| Composition of master batch (M) |  |  |  |  |  |  |  |  |  |  |  |  |
| Polyester resin (R) | Content | wt % | 40 | 10 | 25 | 0 | 40 | 40 | — | — | — | 40 |
| Polyester resin (A) | Kind | — | A-1 | A-1 | A-1 | A-1 | A-1 | A-2 | — | — | — | A-3 |
|  | Content | wt % | 30 | 60 | 60 | 70 | 30 | 30 | — | — | — | 30 |
|  | Tg | °C. | 95 | 95 | 95 | 95 | 95 | 100 | — | — | — | 110 |
| Polyamide resin (B) | Kind | — | B-1 | B-1 | B-1 | B-1 | B-2 | B-1 | — | — | — | B-1 |
|  | Content | wt % | 30 | 30 | 15 | 30 | 30 | 30 | — | — | — | 30 |
| Transition metal (Co) | Content | ppm | — | — | — | — | — | — | — | — | — | — |

TABLE 2-continued

|  |  |  | Example | | | | | | Comparative Example | | | |
|---|---|---|---|---|---|---|---|---|---|---|---|---|
|  |  |  | 7 | 8 | 9 | 10 | 11 | 12 | 1 | 2 | 3 | 4 |
|  |  |  | Dilution ratio | | | | | | | | | |
| Master batch (M) | Content | wt % | 10 | 10 | 20 | 10 | 10 | 10 | — | — | — | 10 |
| Polyester resin (R) | Content | wt % | 90 | 90 | 80 | 90 | 90 | 90 | — | — | — | 90 |
|  |  |  | Polyester resin composition | | | | | | | | | |
| Polyester resin (R) | Content | wt % | 94 | 91 | 85 | 90 | 94 | 94 | 100 | 97 | 97 | 94 |
| Polyester resin (A) | Kind | — | — | A-1 | A-1 | A-1 | A-1 | A-1 | A-2 | — | — | — | A-3 |
|  | Content | wt % | 3 | 6 | 12 | 7 | 3 | 3 | 0 | 0 | 0 | 3 |
| Polyamide resin (B) | Kind | — | B-1 | B-1 | B-1 | B-1 | B-2 | B-1 | — | B-1 | B-2 | B-1 |
|  | Content | wt % | 3 | 3 | 3 | 3 | 3 | 3 | 0 | 3 | 3 | 3 |
| Transition metal (Co) | Content | ppm | — | — | — | — | — | — | — | — | — | — |
|  |  |  | Measurement results | | | | | | | | | |
| Bottle | Haze | % | 2.2 | 2.7 | 3.0 | 3.7 | 4.4 | 3.9 | 0.4 | 5.0 | 5.9 | 9.1 |
|  | Oxygen transmission coefficient | (*1) | A | A | A | A | A | B | C | A | A | B |
|  | Carbon dioxide transmission coefficient | (*2) | A | B | B | A | A | B | C | A | A | C |

(*1) Unit of oxygen transmission coefficient: cc · mm/(m$^2$ · day · atm)
(*2): Unit of carbon dioxide transmission coefficient: cc · mm/(m$^2$ · day)

TABLE 3

|  |  |  | Comparative Example | | | |
|---|---|---|---|---|---|---|
|  |  |  | 9 | 10 | 11 | 12 |
| Composition of master batch (M) | | | | | | |
| Polyester resin (R) | Content | wt % | 40 | 10 | 40 | 10 |
| Polyester resin (A) | Kind | — | A-1 | A-1 | A-1 | A-1 |
|  | Content | wt % | 30 | 30 | 30 | 30 |
|  | Tg | ° C. | 95 | 95 | 95 | 95 |
| Polyamide resin (B) | Kind | — | B-1 | B-1 | B-1 | B-1 |
| Transition metal (Co) | Content | ppm | 1000 | 1000 | — | — |
|  |  |  | Dilution ratio | | | |
| Master batch (M) | Content | wt % | 67 | 33 | 67 | 33 |
| Polyester resin (R) | Content | wt % | 33 | 67 | 33 | 67 |
|  |  |  | Polyester resin composition | | | |
| Polyester resin (R) | Content | wt % | 60 | 70 | 60 | 70 |
| Polyester resin (A) | Kind | — | A-1 | A-1 | A-1 | A-1 |
|  | Content | wt % | 20 | 10 | 20 | 10 |
| Polyamide resin (B) | Kind | — | B-1 | B-1 | B-1 | B-1 |
|  | Content | wt % | 20 | 20 | 20 | 20 |
| Transition metal (Co) | Content | ppm | 100 | 100 | — | — |
|  |  |  | Measurement results | | | |
| Bottle | Haze | % | 10.5 | 16.3 | 10.3 | 16.0 |
|  | Oxygen transmission coefficient | (*1) | A | A | A | A |
|  | Carbon dioxide transmission coefficient | (*2) | A | A | A | A |

(*1) Unit of oxygen transmission coefficient: cc · mm/(m$^2$ · day · atm)
(*2): Unit of carbon dioxide transmission coefficient: cc · mm/(m$^2$ · day)

According to Tables 1 to 3, it is known that in Examples 1 to 12 satisfying the constituent requirements of the present invention, the molded articles had a small haze and were excellent in transparency, and in addition, had a low oxygen transmission coefficient and a low carbon dioxide transmission coefficient and were excellent in gas-barrier property.

It is known that, even though the content of the polyamide resin (B) in the final polyester-based resin composition were the same, the molded article in Example 1 where the master batch (M) contained the polyester resin (R) was more excellent in transparency and gas-barrier property as compared with that in Example 4 where the master batch (M) did not contain the polyester resin (R). The molded articles in both of Examples 1 and 4 were excellent in gas-barrier property. The same result applies to Example 10 and Example 7.

On the other hand, in Comparative Examples 2 and 3 and in Comparative Examples 6 and 7, where the polyester-based resin composition was prepared without forming the master batch (M), the haze was large and the transparency was poor.

In Comparative Examples 1 and 5, where the polyester-based resin composition did not contain the polyester resin (A) and the polyamide resin (B), the oxygen transmission coefficient and the carbon dioxide transmission coefficient were large, that is, sufficient gas-barrier property could not be realized.

Further, in Comparative Examples 4 and 8 where the glass transition temperature of the polyester resin (A) was higher than 105° C., the haze was large and the transparency was poor, and additionally the carbon dioxide transmission coefficient was large, that is, sufficient gas-barrier property could not be realized.

In Comparative Examples 9 and 11 where the content of the polyester resin (A) was more than 15.0% by mass, the haze was large and the transparency was poor. Further, also in Comparative Examples 9 to 12 where the content of the polyamide resin (B) is more than 10% by mass, the haze was large and the transparency was poor.

The invention claimed is:

1. A method for producing a polyester-based resin composition, comprising a step of obtaining a master batch (M) containing a polyester resin (A) having a cyclic acetal structure or a cycloalkane structure having 3 to 10 carbon atoms, and a polyamide resin (B), and
a step of melt-kneading the master batch (M) with a polyester resin (R), which excludes the polyester resin (A), in which 70 mol % or more of the dicarboxylic acid unit is derived from an aromatic dicarboxylic acid and 70 mol % or more of the diol unit is derived from an aliphatic diol, thereby giving a polyester-based resin composition, in this order, wherein:
the glass transition temperature of the polyester resin (A) is 105° C. or lower,
the content of the polyester resin (A) in the polyester-based resin composition is 0.5 to 15.0% by mass, the content of the polyamide resin (B) in the polyester-based resin composition is 0.5 to 10.0% by mass, and the ratio of the content of the polyester resin (A) in the master batch (M) to the content of the polyester resin (A) in the polyester-based resin composition is 5:1 to 10:1.

2. The method for producing a polyester-based resin composition according to claim 1, wherein the master batch (M) consists of the polyester resin (A) and the polyamide resin (B) and the content of the polyester resin (A) in master batch (M) is 10 to 90% by mass, and the content of the polyamide resin (B) is 10 to 90% by mass.

3. The method for producing a polyester-based resin composition according to claim 1, wherein the master batch (M) further contains the polyester resin (R).

4. The method for producing a polyester-based resin composition according to claim 3, wherein the content of the polyester resin (A) in the master batch (M) is 3 to 90% by mass, and the content of the polyamide resin (B) is 3 to 90% by mass.

5. The method for producing a polyester-based resin composition according to claim 3, wherein the content of the polyester resin (R) in the master batch (M) is 5% by mass or more based on 100% by mass of the master batch (M).

6. The method for producing a polyester-based resin composition according to claim 1, wherein the polyester-based resin composition further contains a transition metal.

7. The method for producing a polyester-based resin composition according to claim 6, wherein the master batch (M) contains a transition metal.

8. The method for producing a polyester-based resin composition according to claim 6, wherein the content of the transition metal in the polyester-based resin composition is 10 to 1,000 ppm.

9. The method for producing a polyester-based resin composition according to claim 1, wherein the polyamide resin (B) is a polyamide resin having a diamine unit containing a metaxylylenediamine unit in an amount of 70 mol % or more and a dicarboxylic acid unit containing an am-aliphatic dicarboxylic acid in an amount of 70 mol % or more.

10. The method for producing a polyester-based resin composition according to claim 1, wherein the relative viscosity of the polyamide resin (B) is 1.5 to 4.2.

11. The method for producing a polyester-based resin composition according to claim 1, wherein the polyester resin (A) is a polyester resin having at least one of a dicarboxylic acid unit having a cyclic acetal structure and a diol unit having a cyclic acetal structure.

12. The method for producing a polyester-based resin composition according to claim 1, wherein the diol unit having a cyclic acetal structure is derived from a compound represented by the following formula (1) or (2):

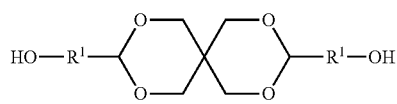
(1)

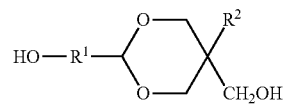
(2)

wherein $R^1$ each independently represents a divalent organic group selected from the group consisting of a divalent aliphatic group having 1 to 10 carbon atoms, a divalent alicyclic group having 3 to 12 carbon atoms, and a divalent aromatic group having 6 to 18 carbon atoms, and $R^2$ represents a monovalent organic group selected from the group consisting of a monovalent aliphatic group having 1 to 10 carbon atoms, a monovalent alicyclic group having 3 to 12 carbon atoms, and a monovalent aromatic group having 6 to 18 carbon atoms.

13. The method for producing a polyester-based resin composition according to claim 1, wherein the polyester resin (A) is a polyester resin obtained through polycondensation with a dicarboxylic acid component containing a dicarboxylic acid having a cyclic acetal structure in an amount of 10 to 40 mol % of the total dicarboxylic acid component and/or a diol component containing a diol having a cyclic acetal structure in an amount of 10 to 40 mol % of the total diol component.

14. The method for producing a polyester-based resin composition according to claim 1, wherein the polyester resin (A) is a polyester resin having at least one of a dicarboxylic acid unit having an alicyclic hydrocarbon structure and a diol unit having an alicyclic hydrocarbon structure.

15. The method for producing a polyester-based resin composition according to claim 14, wherein the diol unit having an alicyclic hydrocarbon structure is derived from a compound represented by the following formula (5):

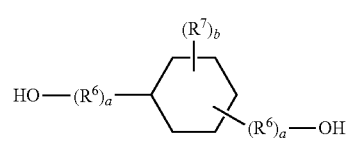
(5)

wherein $R^6$ each independently represents a divalent aliphatic group having 1 to 10 carbon atoms; $R^7$ represents a monovalent organic group selected from the group consisting of a monovalent aliphatic group having 1 to 10 carbon atoms, a monovalent alicyclic group having 3 to 12 carbon atoms and a monovalent aromatic group having 6 to 18 carbon atoms; a indicates 0 or 1, and when a=0, the hydroxyl group directly bonds to the cyclohexane ring; and b indicates an integer of 0 to 4.

16. A method for producing a molded article, comprising a step of molding a polyester-based resin composition obtained according to the production method for a polyester-based resin composition of claim 1.

* * * * *

UNITED STATES PATENT AND TRADEMARK OFFICE
CERTIFICATE OF CORRECTION

PATENT NO. : 11,130,859 B2  
APPLICATION NO. : 15/779807  
DATED : September 28, 2021  
INVENTOR(S) : Takanori Miyabe et al.

Page 1 of 1

It is certified that error appears in the above-identified patent and that said Letters Patent is hereby corrected as shown below:

On the Title Page

Item (57) Abstract, in Line 15:
Please delete "order,." and insert -- order. --, therefor.

In the Claims

Column 41, Line 40:
In Claim 9, please delete "am-aliphatic" and insert -- α,ω-aliphatic --, therefor.

Column 41, Line 51:
In Claim 12, please delete "claim 1" and insert -- claim 11 --, therefor.

Signed and Sealed this
Fifteenth Day of March, 2022

Drew Hirshfeld
*Performing the Functions and Duties of the*
*Under Secretary of Commerce for Intellectual Property and*
*Director of the United States Patent and Trademark Office*